(12) United States Patent
Frison

(10) Patent No.: US 12,386,818 B2
(45) Date of Patent: Aug. 12, 2025

(54) DATABASE QUERY GENERATION WITH DISCRETE TRAINING DATA

(71) Applicant: SAP SE, Walldorf (DE)

(72) Inventor: Giancarlo Frison, Mammendorf (DE)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 18/492,418

(22) Filed: Oct. 23, 2023

(65) Prior Publication Data
US 2025/0130991 A1    Apr. 24, 2025

(51) Int. Cl.
| G06F 17/00 | (2019.01) |
| G06F 7/00 | (2006.01) |
| G06F 16/242 | (2019.01) |
| G06F 16/2455 | (2019.01) |
| G06N 5/022 | (2023.01) |

(52) U.S. Cl.
CPC ........ *G06F 16/242* (2019.01); *G06F 16/2455* (2019.01); *G06N 5/022* (2013.01)

(58) Field of Classification Search
CPC .... G06F 16/242; G06F 16/2455; G06N 5/022
USPC ......................................................... 707/759
See application file for complete search history.

(56) References Cited

U.S. PATENT DOCUMENTS

| 2016/0246885 A1* | 8/2016 | Aravamudhan .... G06F 16/9535 |
| 2021/0272013 A1* | 9/2021 | Szanto .................... G06N 20/00 |
| 2022/0083874 A1* | 3/2022 | Bian ....................... G06N 5/022 |

* cited by examiner

*Primary Examiner* — Pavan Mamillapalli
(74) *Attorney, Agent, or Firm* — SCHWEGMAN, Lundberg & Woessner, P.A.

(57) ABSTRACT

Various examples are directed to systems and methods for generating a query of a database. An example method may comprise accessing a knowledge base data structure comprising plurality of nodes and a plurality of edges and accessing a plurality of training samples comprising a plurality of positive training samples and a plurality of negative training samples. The example method may also comprise determining a subgraph comprising a subset of the plurality of nodes and a subset of the plurality of edges, the subset of the plurality of nodes comprising at least two nodes that are also part of the plurality of training samples and executing a subgraph query of the knowledge base data structure, the subgraph query being based at least in part on the subgraph.

20 Claims, 13 Drawing Sheets

DATABASE QUERY GENERATION WITH DISCRETE TRAINING DATA

BACKGROUND

Analytics computing systems are implemented for enterprises, such as business enterprises, to provide analysis of data. An analytics computing system may include software and/or hardware that are arranged to gather, integrate, analyze, and/or present insights regarding underlying data to various users.

The underlying data may be stored at one or more database management systems. One consistent challenge associated with analytics computing systems is determining how to query the database management system or systems in a manner that returns desired data.

BRIEF DESCRIPTION OF DRAWINGS

The present disclosure is illustrated by way of example and not limitation in the following figures.

DETAILED DESCRIPTION

Figure 1:
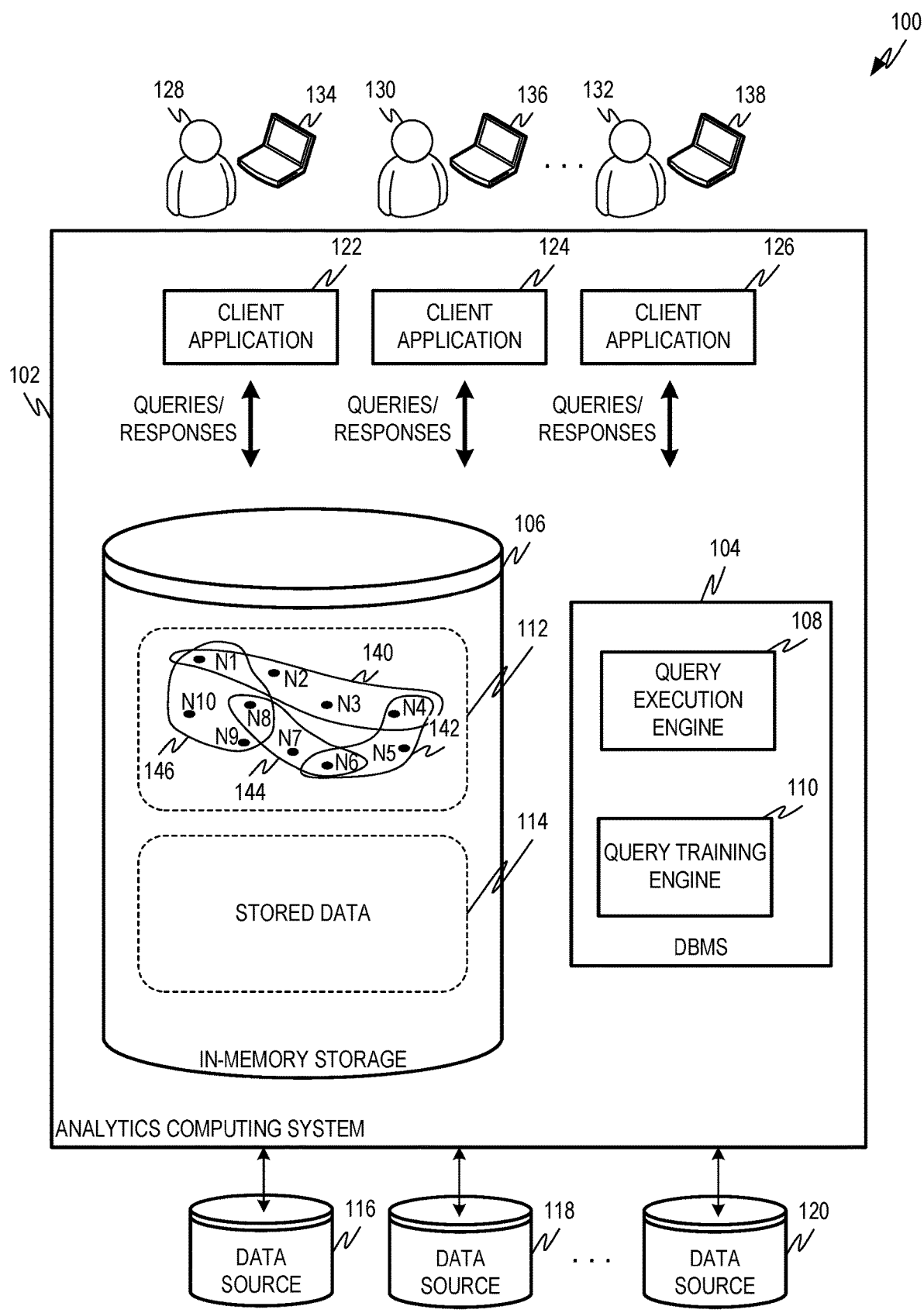
FIG. 1 is a diagram showing one example of an environment including an analytics computing system comprising a database management system (DBMS) that is configured to generate queries using discrete training data.

Analytics computing systems can provide enterprises with detailed analysis of data from different data sources. An analytics computing system is programmed to reflect business processes, technical processes, and/or other processes or systems. The analytics computing system accesses and analyzes available data according to its programming to provide enterprise users with data analysis that is consistent with the underlying business processes, technical processes, and/or the like.

One challenge associated with analytics computing systems is generating database queries that will return the best data for correctly and accurately describing and managing business processes. Machine learning has been used to improve the performance of computing systems in many different areas. Traditional machine learning, however, can be difficult to apply to the problem of generating database queries. This is because many machine learning applications utilize statistical techniques based on continuous training data. For example, many machine learning models are trained utilizing gradient descent or similar mathematical techniques that are premised on continuous training data.

Potential training data for querying a database, however, is often discrete. Consider an example set of training samples for generating a query. Each training sample may describe a relationship between two or more concepts. For example, a first training sample may indicate that the query should return cities that are in a certain region of a country. A second training sample may indicate that the query should not return cities with less than a threshold population (e.g., ten thousand people). Because of the discrete nature of the training data, it may be challenging to apply a traditional machine learning model, such as a neural network, to develop an appropriate query.

Various examples address these and other challenges by utilizing a query determination that is based on discrete training samples. Data relationships may be represented in hypergraph form as a knowledge base data structure. The knowledge base data structure may comprise a plurality of nodes that are connected by a respective plurality of edges. Each node may correspond to a concept, such as a person, place, thing, action, and/or the like. Edges in the knowledge base data structure may connect concepts that are related and may reflect a particular relationship. Consider an example knowledge base data structure comprising nodes corresponding to cities and nodes corresponding to countries. The knowledge base data structure may have a first node corresponding to the city Berlin and a second node corresponding to the country Germany. An edge representing the relationship "is the capital of" may connect the first node and the second node. An edge representing the relationship "is in" may also connect the first node and the second node. The edge "is in" may also relate the node for Germany to other nodes for other cities that have the same relationship to Germany. In this way, a single edge may relate more than two of the nodes.

Various examples utilize the knowledge base data structure to generate a query for a database, for example, in the context of an analytics computing system. A database management system, or other suitable computer system, may access a plurality of training samples. The training samples may represent relationships between nodes of the knowledge base data structure. The training samples may include positive training samples and negative training samples. Positive training samples describe relationships between nodes that should be returned by the query. Negative training samples describe relationships between nodes that should not be returned by the query.

The database management system may utilize the plurality of training nodes to generate a subgraph. The subgraph comprises a subset of the nodes from the knowledge base data structure and a subset of the edges from the knowledge base data structure, connect (e.g., describe relationships between) nodes from the subset of nodes. The nodes and edges included in the subgraph may comprise at least the nodes and edges of the positive training samples.

The database management system may utilize the subgraph to generate a subgraph query that is executed against the knowledge base data structure. The result of the subgraph query may be used to evaluate whether the subgraph query is consistent with both the positive training samples and the negative training samples. If the subgraph query returns any of the negative training samples, it may be revised, as described herein, to exclude the relationships described by the negative training samples. When a subgraph query is revised to exclude negative training samples when executed against the knowledge base data structure, it may be used to generate a query for execution at the database. For example, the revised subgraph query may be converted to a Structured Query Language (SQL) or other query based on the relationships and information represented by the various tables of the database.

FIG. 1 is a diagram showing one example of an environment 100 including an analytics computing system 102 comprising a DBMS 104 that is configured to generate queries using discrete training data. The analytics computing system 102 can be configured to perform various tasks using analytics computing system 102 resources such as, for example, data sources 116, 118, 120. Tasks performed by the analytics computing system 102 can include, for example, providing various reports, forecasts, responses to user queries, and/or the like based on underlying resources. An example analytics computing system 102 is the SAP® Analytics Cloud available from SAP SE of Waldorf, Germany.

The analytics computing system 102 also comprises an in-memory storage 106. The in-memory storage 106 may be random access memory (RAM) or other suitable memory implemented across one or more computing devices. The in-memory storage may store a knowledge base data structure 112 and, optionally, other stored data 114 utilized by the DBMS 104. The stored data 114 may be arranged in a hypergraph format comprising nodes and edges, as described herein and/or according to another database format or scheme a, for example, including tables made up of rows and columns.

In-memory storage 106 may be characterized by faster read and write times relative to nonvolatile storage. Accordingly, the DBMS 104 may be programmed to load data from one or more of the data sources 116, 118, 120 to the in-memory storage 106 to facilitate faster read and write times. Also, the in-memory storage 106 may facilitate the query development techniques described herein.

In some examples, the analytics computing system 102 is implemented in an on-premise environment. For example, an enterprise utilizing the analytics computing system 102 may maintain an on-premise computing system. The analytics computing system 102 may be implemented by executing appropriate software at the on-premise computing system. Users 128, 130, 132 associated with the enterprise may access the analytics computing system 102 by accessing the on-premise computing system, for example, using one or more user computing devices 134, 136, 138.

In some examples, the analytics computing system 102 is implemented in a cloud environment. For example, the analytics computing system 102 may be implemented in a public cloud environment or in a private cloud environment. In a private cloud environment, the enterprise may provide applications, implement storage, and the like, to implement the analytics computing system 102 at the private cloud environment. Executables and/or other software for implementing the analytics computing system 102 at the private cloud environment may be provided, for example, by a software provider. Users 128, 130, 132 of the enterprise may access the analytics computing system 102 at the private cloud environment, for example, to request, configure, and/or consume the analytics reports and/or other outputs of the analytics computing system 102.

In a public cloud environment, the cloud environment is arranged into a number of tenancies implemented by a cloud service provider. The cloud service provider may provide one or more executables or other components to implement the analytics computing system 102 at the public cloud environment. The enterprise may hold one or more tenancies, allowing users 128, 130, 132 of the enterprise to access one or more instances of the analytics computing system 102 at the public cloud environment to consume analytics reports, query responses, and/or other outputs of the analytics computing system 102.

The analytics computing system 102 may be in communication with the various data sources 116, 118, 120. The data sources 116, 118, 120 may be or include various different computing systems, storage devices, and/or services for storing data. The data stored at the data sources 116, 118, 120 can be used by the analytics computing system 102 to generate various analytics outputs such as, reports, forecasts, responses to user queries, and/or the like, as described herein. In some examples, the DBMS 104 is configured to load some or all of the data available from the data sources 116, 118, 120 to the in-memory storage 106 where it can be used to generate and execute queries.

In some examples, data sources 116, 118, 120 may include cloud-delivered data source services and/or on-premise implemented data sources. For example, a cloud service provider may implement the cloud-delivered data source services in a public cloud environment. In some examples, one or more of the data sources 116, 118, 120 are implemented in a private cloud environment, for example, by the enterprise. Examples of cloud-delivered data source services may include cloud versions of S/4 HANA™, SAP Concur®, SAP Successfactors®, SAP Data Warehouse Cloud, Inbound Document (IBD), available from SAP SE of Waldorf, Germany. Other examples of cloud-delivered data sources may include SQL database services such as, for example, BigQuery® available from Google, LLC of Mountain View, California, Sharepoint® available from Microsoft Corporation of Redmond, Washington, various data storage products available from Salesforce, Inc. of San Francisco, California, and/or the like.

On-premise data sources may be implemented at one or more on-premise computing systems, which may be maintained by the consumer entity and/or another suitable entity. Examples of on-premise data sources may include on-premise versions of S/4 HANA™, SAP Business Warehouse, SAP Business Planning and Consolidation, SAP HANA™, various SQL, or other database management systems executed at an on-premise computing system and/or the like.

Data sources 116, 118, 120 may comprise data stored according to various formats. In some examples, one or more of the data sources 116, 118, 120 may include data stored in a hyper graph format, for example, similar to the knowledge base data structure 112. In other examples, one or more of the data sources 116, 118, 120 may comprise data stored in other scheme arrangements, such as, for example in collections of tables having rows and columns.

The users 128, 130, 132 may be associated with the enterprise utilizing the analytics computing system 102. The users 128, 130, 132 may access the analytics computing system 102 and/or one or more of the various data sources 116, 118, 120 utilizing the user computing devices 134, 136, 138. User computing devices 134, 136, 138 may be or include various different types of computing devices such as, for example, desktop computers, laptop computers, tablet computers, mobile computing devices, and/or the like.

The analytics computing system 102 may also execute one or more client applications 122, 124, 126. Client applications 122, 124, 126 may communicate with the DBMS 104 to retrieve and store data. The client applications 122, 124, 126, in some examples, may also perform analytics related tasks such as, for example, implementing an accounting application for managing enterprise accounting, a human resources application for managing enterprise human resources, and environmental management application for managing enterprise environmental matters, and/or the like. Users 128, 130, 132 may, in some examples, access the analytics computing system via the client applications 122, 124, 126. To provide service to the users 128, 130, 132, the client applications may direct various queries to the DBMS 104 and receive various responses to the queries. In some examples, the client applications 122, 124, 126 may also provide training data sets to the DBMS 104.

The DBMS 104 may comprise a query execution engine 108 and a query training engine. The query execution engine 108 may be configured to execute queries against the knowledge base data structure 112 and/or against the store data 114 at the in-memory storage 106. The query training engine 110 may be configured to train or generate queries utilizing the knowledge base data structure 112.

The knowledge base data structure 112 may comprise a plurality of nodes N1-N10. Although ten nodes N1-10 are shown in FIG. 1, it will be appreciated that the knowledge base data structure 112 may contain more or fewer nodes than are shown. The example knowledge base data structure 112 may also comprise edges that indicate relationships between the nodes. For example, the edge 140 describes a relationship between nodes N1, N2, N3, and N4. The edge 142 describes a relationship between nodes N4, N5, and N6. The edge 144 describes a relationship between nodes N6, N7, and N8. The edge 146 describes a relationship between nodes N1, N8, N9, and N10.

The knowledge base data structure 112 may represent a hyper graph. A hypergraph may be a type of graph in which a single edge can join any number of nodes, such as, for example more than two nodes. Consider again the example above with nodes corresponding to cities are related by edges corresponding to different relationships. The nodes corresponding to Berlin, Munich, and Düsseldorf may all be connected to the node corresponding to Germany by an edge representing the relationship "is in." Consider another example including nodes correspond to manufactured parts and assemblies. Multiple nodes corresponding to different manufactured parts may be connected to an node corresponding to an assembly by an edge representing the relationship "is a component of." Consider another example with nodes corresponding to employees and geographic locations of an enterprise. Multiple nodes corresponding to different employees may be connected to a common geographic location by an edge representing the relationship "reports to work at."

Figure 2:
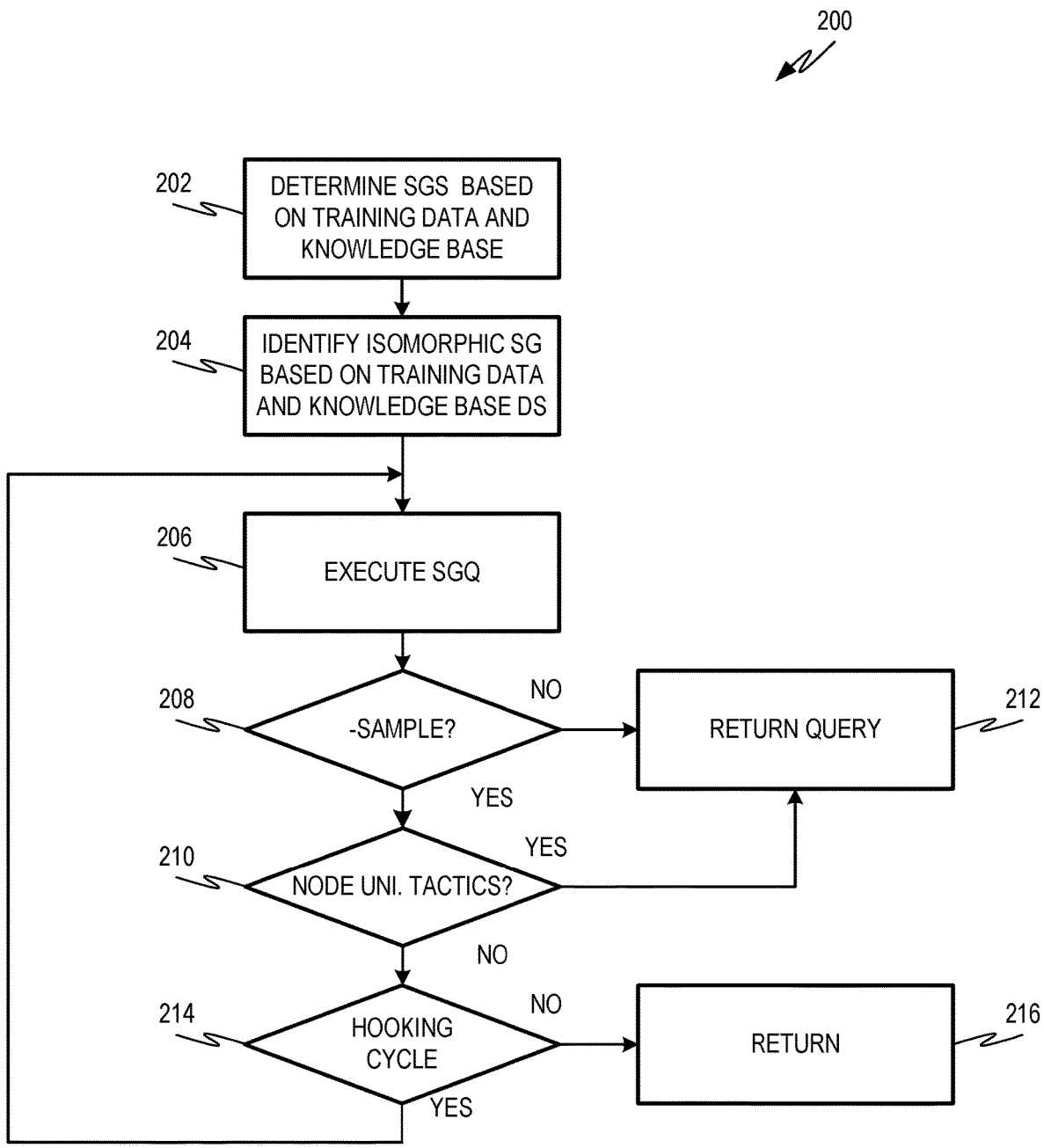
FIG. 2 is a flow chart showing one example of a process flow that may be executed in the environment of FIG. 1 to develop a query utilizing the knowledge base data structure and discrete training data.

FIG. 2 is a flow chart showing one example of a process flow 200 that may be executed by the query training engine 110 to develop a query utilizing the knowledge base data structure 112. Queries generated by the query training engine 110 may be executed against the knowledge base data structure 112 and/or against the stored data 114 managed by the DBMS 104.

At operation 202, the query training engine 110 may determine a set of subgraphs using training data and the knowledge base data structure 112. The training data may comprise a set of positive training samples and a set of negative training samples. The set of positive training samples may include nodes and relationships/edges therebetween that should be returned by the query to be generated. The set of negative training samples may include nodes and relationships/edges therebetween that should not be returned by the query to be generated.

Consider an example query that is to return employees of an enterprise who report to work at a particular geographic location who also have salaries meeting certain conditions. Positive samples may include nodes corresponding to employees and the particular geographic location and edges corresponding to the relationship "reports to work at." Negative samples may include nodes corresponding to employees, nodes corresponding to employee salary, and edges representing relationships that fail to meet the salary conditions for the query.

The query training engine 110 may identify terminal subgraphs of the knowledge base data structure 112. A terminal subgraph may be a subgraph that includes a given set of terminals. In this example, a terminal subgraph may include all of the nodes of one or more positive training samples. Identifying terminal subgraphs may include generating subgraphs of the knowledge base data structure 112 that interconnect all the terminal nodes of one or more positive training samples. Terminal nodes may be nodes that are included in a positive training sample.

In some examples, the query training engine 110 is configured to return subgraphs in ascending order of edge size, where edge size describes the number of edge connections between terminal nodes included in the subgraph. The knowledge base data structure 112 may generate the subgraphs by traversing the knowledge base data structure 112, for example, as described herein. The query training engine 110 may continue generating subgraphs, for example, until one or more conditions are met. In some examples, the query training engine 110 may continue generating subgraphs until all subgraphs of a given threshold edge are determined.

At operation 204, the query training engine 110 may identify an isomorphic subgraph from the subgraphs generated at operation 202. Isomorphic subgraphs may be subgraphs that have an equivalent structure. For example, two subgraphs may be isomorphic if it is possible to arrange the subgraphs such that they look the same. In another example, two subgraphs may be isomorphic when there exists a function (FN) that can uniquely transform the nodes from one subgraph into the nodes of the other subgraph. Various different techniques may be used to identify isomorphic subgraphs including, for example, the Weisfeiler-Leman algorithm and derivatives thereof.

At operation 206, the query training engine 110 may execute a subgraph query at the knowledge base data structure 112. The subgraph query may be a query of the knowledge base data structure 112 that is based on an isomorphic subgraph identified at operation 204. The subgraph query may be generated by modifying the subgraph. For example, terminals at the subgraph may be replaced with variables of a first series. Nodes at the subgraph that are not terminals and occur more than once may be replaced with variables of a second series. Nodes at the subgraph that are not terminals and only occur once may be replaced by a wildcard variable.

Consider the example subgraph given by Expression [1] below:

$$p(1, a, b), q(2, b, c) \qquad [1]$$

In this example, the letters "p" and "q" represent edges and "1," "2," "a," "b," and "c" represent nodes. In this example, the nodes "a" and "c" are terminals. The node "b" is a non-terminal node that occurs more than once. The nodes represented by "1" and "2" are non-terminal nodes that occur once. Accordingly, a subgraph query may be generated from the example subgraph given by Expression [1] as shown by Expression [2] below:

$$p(\_, X0, B0), q(\_, B0, X1) \qquad [2]$$

In this example, the terminal nodes "a" and "c" are replaced by variables of the series X (e.g., X1, X2, X3, and so on). The repeating non-terminal node "b" is replaced by variables of the series B (e.g., B0, B1, B2, and so on). The non-repeating non-terminal nodes "1" and "2" are replaced with the wildcard variable "_."

The result of executing the subgraph query at the knowledge base data structure 112 includes instances of particular nodes corresponding to the variables of the subgraph query. In some examples, the result may be described as a result table with columns corresponding to the variables and rows corresponding to particular nodes from the knowledge base data structure 112 returned as values for the variables. In some examples, the rows may correspond to positive training samples and/or negative training samples from the training sample set. In some examples, the result of the subgraph query may include data that was not part of the negative training samples or the positive training samples. In various examples, further operations on the results of the subgraph queries, as described herein, may be based on the records from the results that are also either positive training samples or negative training samples.

At operation 208, the query training engine 110 may determine if the results of the subgraph query at operation 206 include any negative training samples. For example, when the results of the subgraph query are represented as a result table, this may involve determining if any rows in the subgraph query indicate a set of nodes corresponding to a negative training sample. If the result of the subgraph query does not include any of the negative training samples, it may be an indication that the scope of the subgraph query meets the conditions for the query. Accordingly, if the result of the subgraph query does not include any of the negative training samples, then the query training engine 110 may return a database query that is or is based on the subgraph query. The query training engine 110 may return the subgraph query in a form that may be executed against the knowledge base data structure 112 and/or against stored data 114. In some examples, this may include modifying the subgraph query to a logical equivalent in SQL or another database querying language.

If, at operation 208, the result of the subgraph query does include a negative training sample, it may indicate that the subgraph query is returning overinclusive results and may, therefore, be subject to further refinement. At operation 210, the query training engine 110 may determine whether node unification tactics can generate a query with results. Various node unification tactics may be used. In some examples, the query training engine 110 may attempt to find a common constant returned as a value for a non-terminal variable or variables corresponding to the terminal nodes of all positive training samples or corresponding to the terminal nodes of all negative training samples included in the subgraph query result. When the subgraph query result is represented as a result table, this may include determining whether any columns of the table have a common value for all positive training samples and/or all negative training samples. After detecting a common constant, the query training engine 110 may modify the subgraph query to require the common constant (if common to positive training samples) or to exclude the common constant (if common to negative training samples).

Another example node unification tactic may include determining whether any pairs of non-terminal variables corresponding to the terminal nodes of all negative training samples. If this is detected, the query training engine 110 may be configured to generate a revised subgraph query that omits terminal node variable values having equal values for the corresponding non-terminal variables.

If node unification tactics are successful in yielding a revised subgraph query at operation 210, then the query training engine 110 may return the revised query generated by the node unification tactics at operation 212. If node unification tactics are not successful in yielding a revised subgraph query, then the query training engine 110 may, at operation 214, execute a hooking cycle. The hooking cycle may involve utilizing the knowledge base data structure 112 to find additional nodes related to the variables indicated by the subgraph query. If additional nodes are determined, then the additional nodes may be added as variables to the subgraph query to generate a revised subgraph query. The revised subgraph query may be executed at operation 206, as described herein. If the hooking cycle is not successful in identifying additional nodes that can be added as variables to the subgraph query, the process may return at operation 216.

Figure 3:
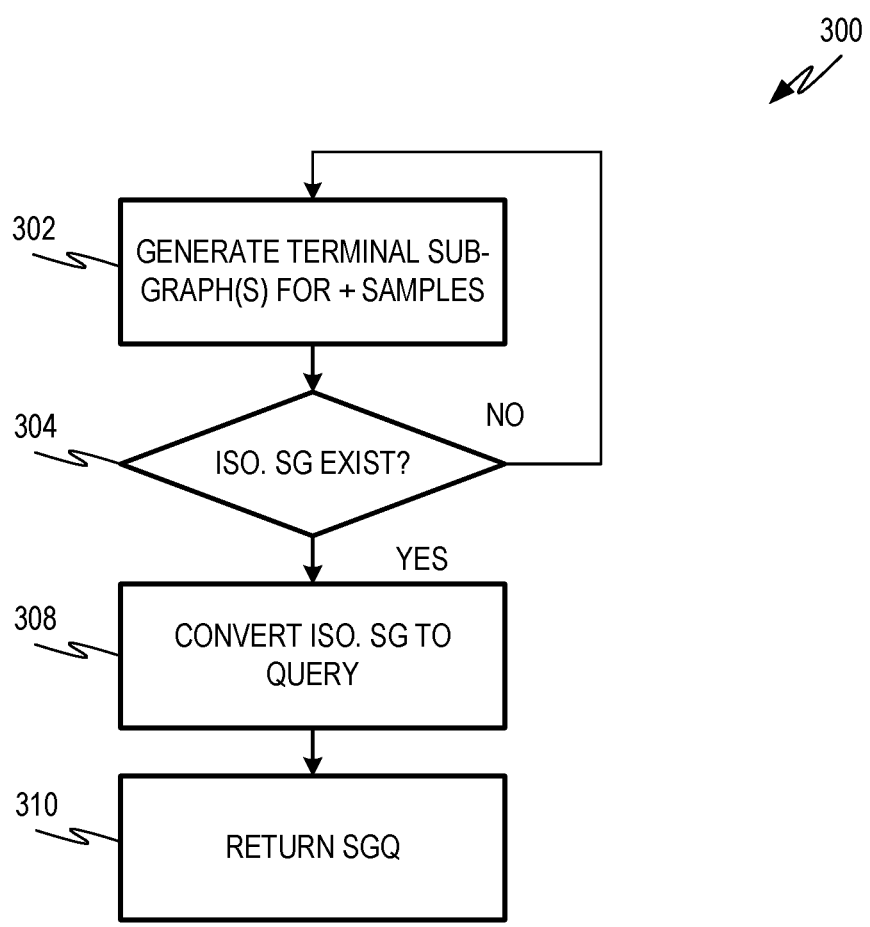
FIG. 3 is a flowchart showing one example of a process flow that may be executed in the environment of FIG. 1 to generate a subgraph query.

FIG. 3 is a flowchart showing one example of a process flow 300 that may be executed by the query training engine 110 to generate a subgraph query. For example, the process flow 300 shows one example way that the query training engine 110 can execute the operations 202 and 204 of the process flow 200.

At operation 302, the query training engine 110 may generate one or more terminal subgraphs for positive training samples of the training sample set. Terminal subgraphs may be subgraphs of the knowledge base data structure that include all the terminal nodes indicated by the positive training sample. Generating the stream of subgraphs may include generating a stream of subgraphs that can be extracted from the knowledge base data structure 112. The stream of subgraphs may be produced in ascending order of size.

At operation 304, the query training engine 110 may determine whether any sets of the subgraphs generated at operation 304 are isomorphic. Isomorphic subgraphs may be identified from the stream of generated subgraphs, for example, using the Weisfeiler-Leman algorithm. If no isomorphic subgraphs exist, then the query training engine 110 may return to operation 302 to generate additional terminal subgraphs for the positive training samples. In some examples, the additional terminal subgraphs may be of a larger size than those previously generated at operation 302.

If isometric subgraphs do exist at operation 304, the query training engine 110 may, at operation 308, convert the form of the isometric subgraphs to a subgraph query. This may be performed, for example, as described herein by replacing terminals at the subgraph replacing repeating non-terminals with variables of a second series, and replacing non-terminals that occur only once with a wildcard variable. At operation 310, the query training engine 110 may return the subgraph query. The query training engine 110 may execute the generated subgraph query, for example, as described with respect to the process flow 200 at operation 206.

Figure 4:
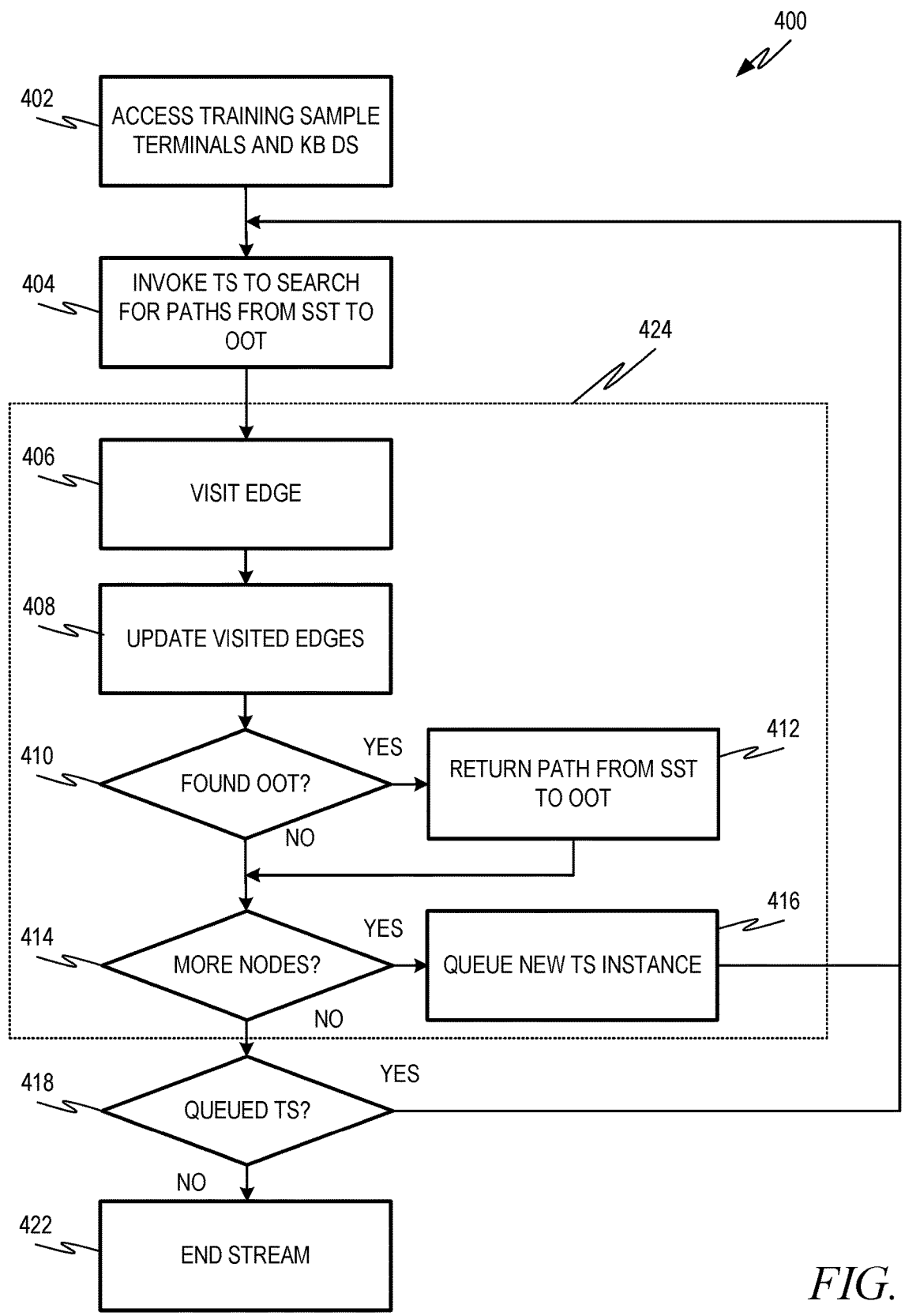
FIG. 4 is a flowchart showing one example of a process flow that may be executed in the environment of FIG. 1 to generate a stream of subgraphs.

FIG. 4 is a flowchart showing one example of a process flow 400 that may be executed by the query training engine 110 to generate a stream of subgraphs. For example, the process flow 400 shows one example way that the query training engine 110 may execute the operation 202 of the process flow 200 and/or the operation 302 of the process flow 300. The process flow 400 is described in terms of subroutines that are referred to as terminal solvers. A terminal solver may be an executable software component or part of an executable software component, such as, an executable function, service, and/or the like.

At operation 402 the query training engine 110 may access training samples, for example positive training samples, and the knowledge base data structure 112. The query training engine 110 may start with a selected terminal from a first positive training sample. The selected terminal may be a first node of the first positive training sample, or a value therefor. The query training engine 110 may utilize terminal solver instances, for example, as described herein, to traverse the knowledge base data structure 112 from the selected terminal and attempt to reach other terminals of the positive training sample.

At operation 404, the query training engine 110 may invoke a terminal solver instance to search for paths at the knowledge base data structure 112 from the selected terminal and to other terminals of the positive training sample. Operations that may be performed by a terminal solver instance are positioned within box 424. The terminal solver instance may be provided a start node and a list of visited edges (e.g., that have been visited by previous terminal solver instances). The start node may be the selected terminal or another node associated with the selected terminal at the knowledge base data structure 112 via one or more other nodes or edges. The terminal solver instance may, at operation 406, visit an edge associated with the target node and determine whether that edge is also associated with another terminal of the positive training sample. The visited edge may not be on the list of already visited edges. At operation 408, the terminal solver instance may update a list of visited edges to indicate the newly visited edge.

If, at operation 410, the terminal solver instance has found another terminal of the positive training sample associated with the visited edge, it may, at operation 412, return a path on the knowledge base data structure 112 from the selected terminal to the identified other terminal. The path may include any nodes and edges of the knowledge base data structure 112 that were visited, for example, by other terminal solver instances, between the selected terminal and the identified other terminal. The path may be a subgraph of the knowledge base data structure 112 corresponding to the positive training sample.

If, at operation 410, the terminal solver instance has not found another terminal of the positive training sample, or after returning a path from the selected terminal to another terminal of the positive training sample, the terminal solver may, at operation 414, determine whether there are any nodes in the knowledge base data structure 112 associated with the currently-visited edge. If there are any nodes, the terminal solver instance may, at operation 416, enqueue a terminal solver instance for each of the nodes. For example, each visited node may be a start node for one of the terminal solver instances added to the queue. The terminal solver instance may terminate upon either determining, at operation 414, that the current edge is not associated with any other nodes or upon queuing one or more terminal solver instances at operation 416.

If no new nodes are found associated with the current edge at operation 414, the query training engine 110 may determine at operation 418 whether there are any queued terminal solver instances. If there are no queued terminal solver instances, the query training engine 110 may include providing subgraphs at operation 422. If there are additional queued terminal solver instances at operation 418, or after an existing terminal solver instance has queued a new terminal solver instance or instances at operation 416, the query training engine 110 may invoke the next terminal solver instance from the queue at operation 414.

In some examples, the terminal solver instances may be prioritized at the queue, for example, based on the distance between the selected terminal and the start node associated with the terminal solver instances. In this way, the subgraphs returned by the respective terminal solver instances may be provided in order of increasing distance from the selected terminal.

Figure 5:
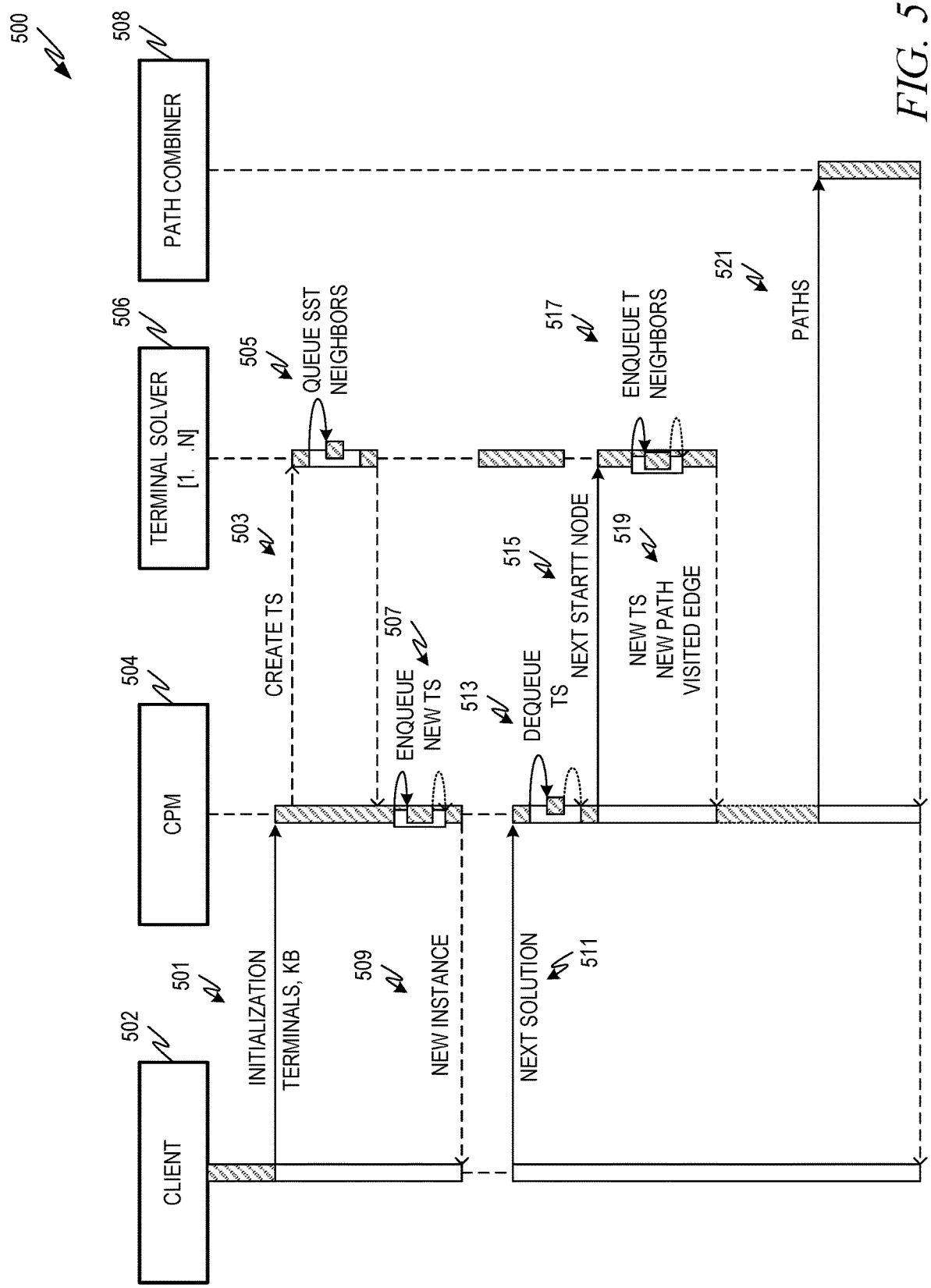
FIG. 5 is a swim lane diagram showing another example arrangement that may be executed in the environment of FIG. 1 to generate subgraphs from the knowledge base data structure.

FIG. 5 is a swim lane diagram showing another example process flow 500 for generating subgraphs from the knowledge base data structure 112. For example, the process flow 500 shows another example way that the query training engine 110 may execute the operation 202 of the process flow 200 and/or the operation 302 of the process flow 300. The process flow 500 includes operations performed by various example components of the query training engine 110. The example components include a client 502, a Connecting Path Module (CPM), a set of terminal solver instances 506, and a path combiner 508.

The client 502 may begin the process of subgraph identification by providing the CPM 504 with a request 501 to initialize including an indication of the terminals of a positive training sample and a reference to the knowledge base data structure 112. In response, the CPM 504 may create a terminal solver instance 503. In response, the terminal solver instance 506 (e.g., an instance thereof) may, at operation 505, queue terminal solver instances for nodes that are neighbors of the selected terminal. Nodes that are neighbors of the selected terminal may include nodes at the knowledge base data structure 112 that are associated with a common edge with the selected terminal.

The CPM 504 may enqueue new terminal solver instances for the neighbor nodes identified at operation 507. The CPM 504 may send a new instance message 509 instructing the client 502 to initialize a new instance of the CPM 504, for example, with terminals of a new positive training sample. This may proceed until all positive training samples are considered.

The client 502 may send a next solution message 511 to the CPM 504. In response, the CPM 504, at operation 513, may dequeue a next terminal solver instance and initialize, at operation 515, the next terminal solver instance using the next start node. The terminal solver instance 506 may visit an edge and, optionally at operation 517, enqueue one or more neighbor nodes associated with the visited edge. The terminal solver instance 506 may return, optionally at return 519, a new terminal solver instance to add to the queue, a new path, if found, and an identity of the visited edge to be added to the list of visited edges. Terminal solver instances may continue to run until, for example, the queue of terminal solver instances is empty.

The CPM 504 may provide a paths instruction 521 to the path combiner 508. In response to the path instruction 521, the path combiner may combine one or more of the paths generated by the terminal solver instances 506 into a subgraph or subgraphs which may be used, for example, as described herein.

Figure 6:
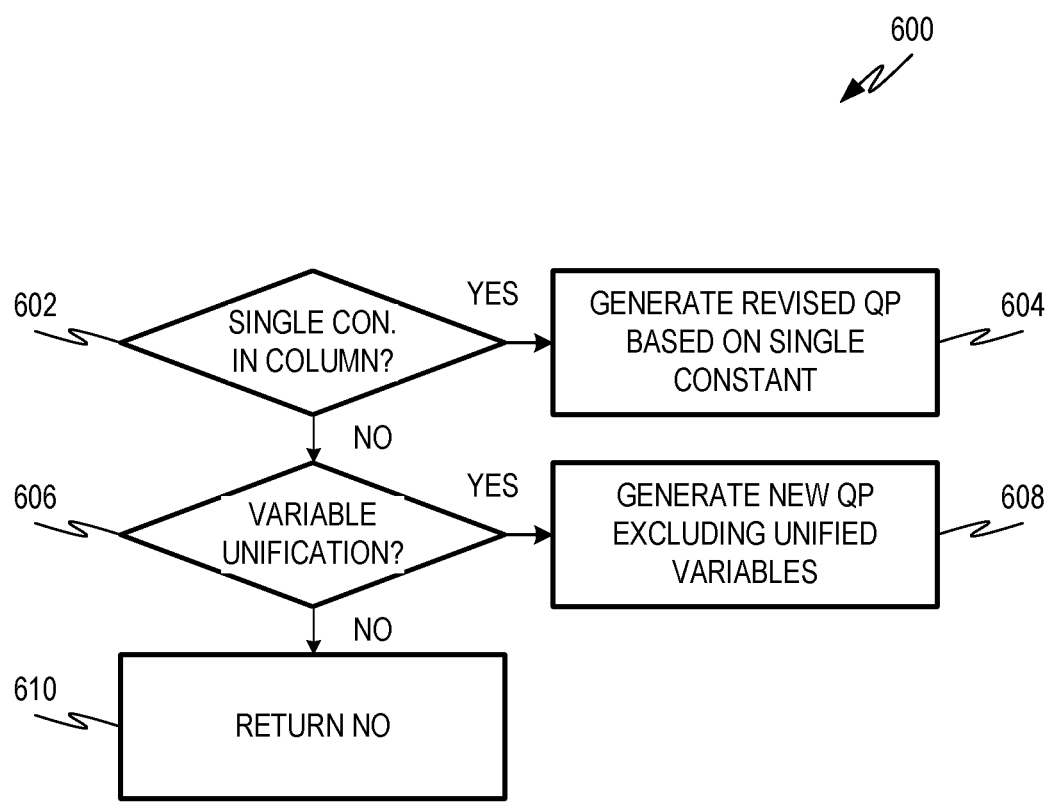
FIG. 6 is a flowchart showing one example of a process flow that may be executed in the environment of FIG. 1 to implement node unification tactics.

FIG. 6 is a flowchart showing one example of a process flow 600 that may be executed by the query training engine 110 to implement node unification tactics. For example, the process flow 600 shows one example way that the query training engine may execute operation 210 of the process flow 200. The process flow 600 describes two example node unification tactics including, a single common constant tactic (operation 602, 604) and a node paring tactic (operation 606 and 608). In various examples, more or fewer node unification tactics may be executed, and in any suitable order.

The process flow 600 may begin with a result of a subgraph query executed against the knowledge base data structure 112. As described herein, the result may include various records with each record including of the subgraph query. At operation 602, the query training engine 110 determines whether any nodes are present in all positive training samples and omitted in all negative training samples, or vice versa. If any nodes are present in all positive training samples and omitted in all negative training samples, then the query training engine 110 may, at operation 604, generate a revised query that includes a constraint indicating that the value of the nodes present in all positive training samples and omitted in all negative training samples. This may be returned as the query for execution at the knowledge base data structure 112 and/or at the store data 114, for example, as described herein with respect to operation 212.

Consider an example subgraph query given by EXPRESSION [3] and a corresponding example result given by TABLE 1 below:

$$p(X0, B0), q(B0, X1) \quad [3]$$

TABLE 1

| Training Sample | Variable | | |
| --- | --- | --- | --- |
| | X0 | X1 | B0 |
| +S | a | b | c |
| | q | w | c |
| −S | 1 | 2 | 2 |

In this example, the subgraph query included to variables, X0 and X1 corresponding to terminals of the subgraph and one variable, B0, corresponding to a repeated non-terminal node of the subgraph. In this example, there are three rows. The first row and the second row correspond to respective positive training samples, indicated by +S. The third row corresponds to a negative training sample, indicated by −S.

In the example of TABLE 1, the node "c" is present as a value for the non-terminal variable "B0" in all records corresponding to positive training samples and omitted in all records corresponding to negative training samples. Accordingly, the query training engine 110 may generate a revised query, for example, as given by EXPRESSION [4] below:

$$p(X0, c), q(c, X1) \quad [4]$$

In EXPRESSION [4], the non-terminal variable B0 is replaced by the node "c" that was present in each positive training sample result and omitted from each negative training sample result.

If no nodes are present in all positive training samples and omitted in all negative training samples, then the query training engine 110 may attempt variable unification at operation 606. This may include determining whether any pairs of non-terminal variables in a subgraph query result have constant values for all negative training samples. If the query training engine 110 determines that there is at least one pair of non-terminal variables in the subgraph query resulted have constant values for all negative training samples, it may generate a revised query at operation 608 including a constraint omitting results that include the common constant value returned for all negative training samples. The revised query may be returned at operation 212 as the query for execution at the knowledge base data structure 112 and/or at the stored data 114.

Consider an example subgraph query given by EXPRESSION [5] and a corresponding example result given by TABLE 2 below:

$$p(X0, B0), q(B0, B1), r(B1, X1) \quad [5]$$

TABLE 2

| Training Sample | Variable | | | |
| --- | --- | --- | --- | --- |
| | X0 | X1 | B0 | B1 |
| +S | 1 | 2 | 3 | 5 |
| −S | a | b | c | c |
| | q | W | h | h |

In this example, all of the negative training samples return common nodes for the non-terminal variables B0 and B1. Accordingly, the query training engine 110 may generate a revised query given by EXPRESSION [6]:

$$p(X0, B0), q(B0, B1), r(B1, X1), B0 \mathrel{!=} B1 \quad [6]$$

If the query training engine 110 is not able to locate either a single constant that is included in all positive training samples and excluded from all negative training samples, or that there is at least one set of non-terminal variables having the same node for each of the negative training samples, then it may return no at operation 610 indicating that node unification tactics have not succeeded.

Figure 7:
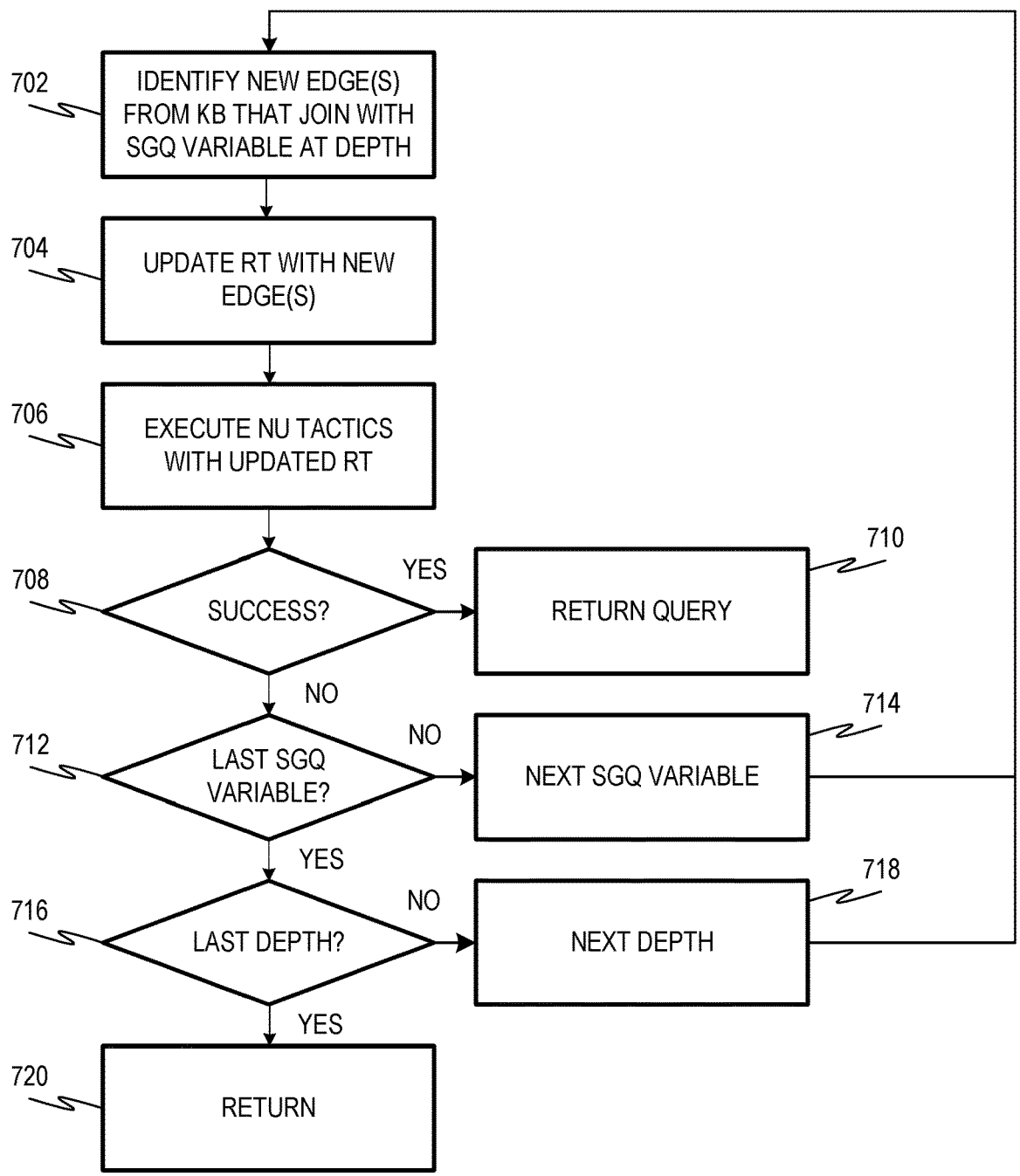
FIG. 7 is a flowchart showing one example of a process flow that may be executed in the environment of FIG. 1 to perform a hooking cycle.

FIG. 7 is a flowchart showing one example of a process flow 700 that may be executed by the query training engine 110 to perform a hooking cycle. For example, the process flow 700 shows one example way that the query training engine 110 may execute portions of the process flow 200 including the operation 214. For example, the process flow 700 may be executed if node unification tactics have failed to yield a revised query from the results of the subgraph query. The hooking cycle, in various examples, may locate additional non-terminal nodes of the knowledge base data structure 112, which may correspond to additional non-terminal variables that may be included in a subgraph query to lead to a subgraph query result that negative training samples or can be successfully revised using node unification tactics. The process flow 700 may begin with a subgraph query and/or subgraph query results as input.

At operation 702, the query training engine 110 may identify one or more new edges from the knowledge base that join with the results of a considered variable of the subgraph query at a first depth. The depth may describe a number of edges of the knowledge base data structure 112 traversed to reach the new edge from the node corresponding to the variable. At operation 704, the query training engine 110 may update the results of the subgraph query using the new edge or edges identified at operation 702. This may include, generating a revised subgraph query with one or more additional variables corresponding to the newly identified one or more edges. The revised subgraph query may be executed at the knowledge base data structure 112 generating revised subgraph query results.

At operation 706, noted unification tactics may be attempted with the revised subgraph query results. This may include, for example, executing the process flow 600 with the revised subgraph query results as input. If the subgraph unification tactics are a success, the query training engine 110 may return a trained query at operation 710.

If the subgraph unification tactics are not a success at operation 708, then the query training engine 110 may determine, at operation 712, if the current considered variable from the subgraph query is the last variable. If not, the query training engine 110 may increment to the next subgraph query variable at operation 714 and return to operation 704. If the currently considered subgraph query variable is the last subgraph query variable to be considered, then the query training engine 110 may determine, at operation 716, whether the current depth is the last depth to be considered. If not, the query training engine 110 may increment to the next greater depth to be considered at operation 718 and then return to operation 702 to consider a first subgraph query variable at the new depth. If the current depth is the last depth, then the query training engine 110 may return at operation 720. For example, if the query training engine 110 does not successfully return a query at operation 710 before all subgraph query variables and depths are considered, it may not successfully return a query.

Figure 8:
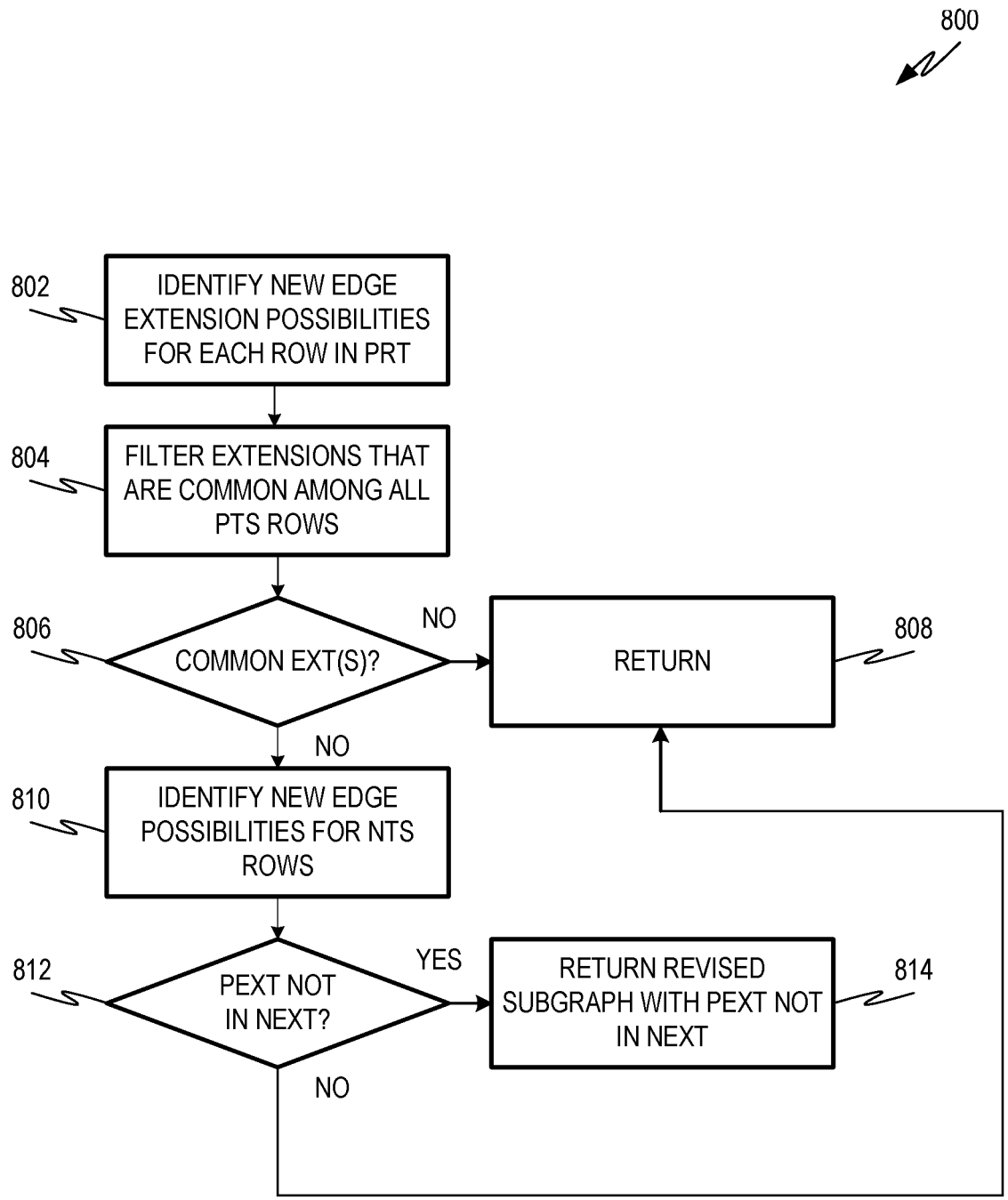
FIG. 8 is a flowchart showing one example of a process flow that may be executed by the query training engine to identify new edges in the knowledge base data structure that join with a subgraph query variable at an indicated depth.

FIG. 8 is a flowchart showing one example of a process flow 800 that may be executed by the query training engine 110 to identify new edges in the knowledge base data structure 112 that join with a subgraph query variable at an indicated depth. For example, the process flow 800 shows one example way that the query training engine 110 may execute the operation 702 of the process flow 700.

At operation 802, the query training engine 110 may identify new edge extension possibilities for each row in the results of the subgraph query corresponding to a positive training samples. For example, each row of a subgraph query result may indicate a node at the knowledge base data structure 112 for the considered variable. The query training engine 110 may identify edges associated with each of the indicated nodes at the knowledge base data structure 112. The identified edges may be determined at the indicated depth. For example, if the indicated depth is one, the identified edges may be edges associated with the node values for the considered variable. If the indicated depth is two, then the identified edges may be edges associated with the node values for the considered variables, or with nodes connected to those node values via an intermediate edge, and so on.

At operation 804, the query training engine 110 may filter edge extensions that are common among all of the rows of the subgraph query result corresponding to positive training samples. If none of the identified extensions are common among all of the rows of the subgraph query results, then the query training engine 110 may return at operation 808, which may indicate that the hooking cycle has failed.

If there is at least one common extension among all rows corresponding to positive training samples, then the query training engine 110 may, at operation 810, identify new edge possibilities for each row corresponding to a negative training sample. At operation 812, the query training engine 110 may determine if any of the common extensions identified at operation 806 are not also included in the new edge extension possibilities identified at 810. If there are new edge extension possibilities common among all positive training samples identified at operation 806 that are not also included in the new edge possibilities for the negative training samples, it may indicate that a subgraph query based on the revised subgraph including the common extensions discriminate between the positive and negative training samples. The query training engine 110 may, at operation 814, return a revised subgraph query including the new common positive edge extensions. If not, the process may return at operation 808.

Figure 9:
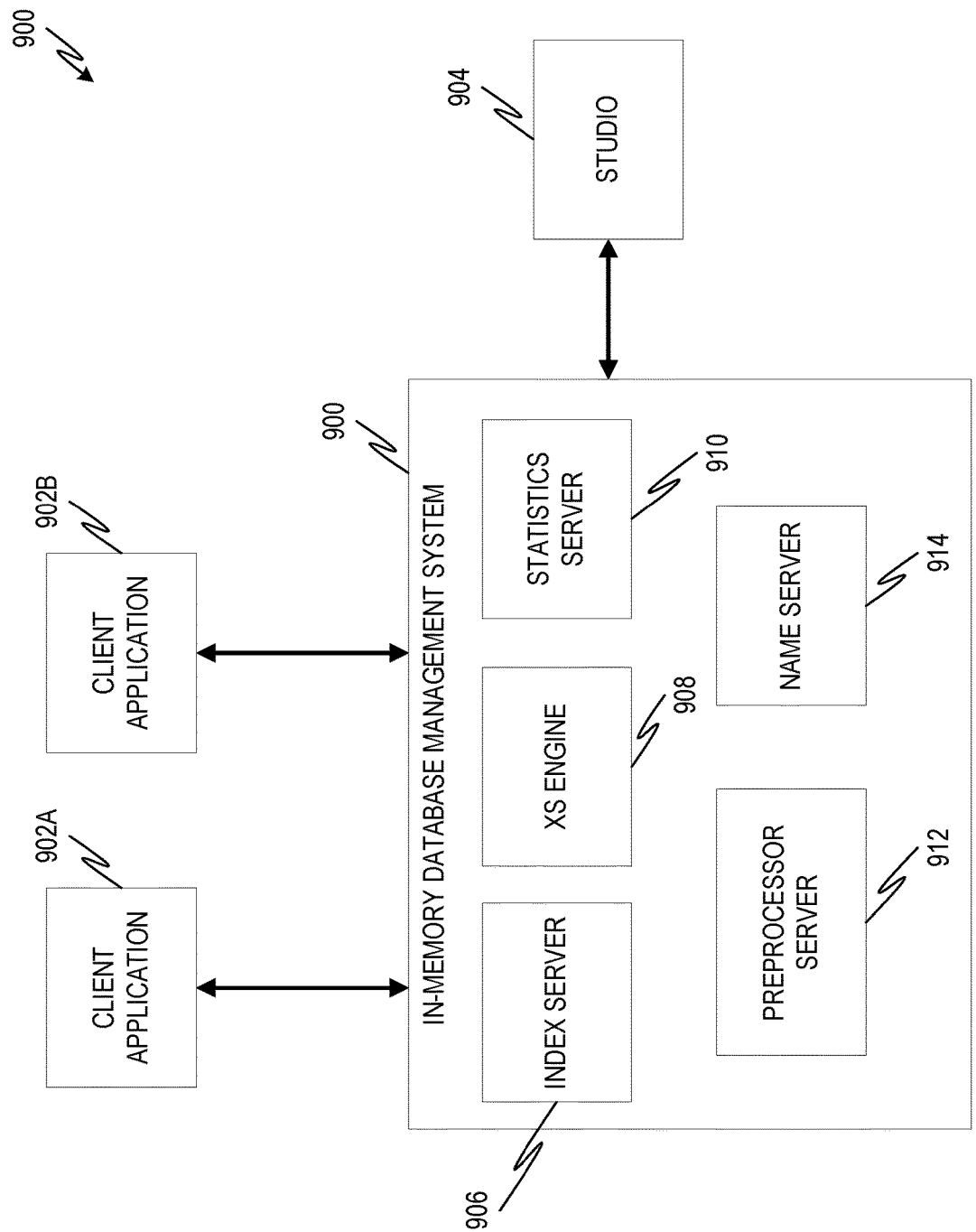
FIG. 9 is a diagram illustrating an example of an in-memory database management system.

FIG. 9 is a diagram illustrating an example of an in-memory database management system 900. An in-memory database stores data primarily at main memory, such as a RAM. This is different than databases that primarily employ a disk storage mechanism. In some examples, the database management system 900 may be or include an example of the HANA system from SAP SE of Walldorf, Germany. Although various features of environmental metric integration are described herein in the context of an in-memory database, carbon footprint optimization may be generally performed at any suitable database management system.

The in-memory database management system 900 can be used to implement various components described herein. For example, the in memory database management system 900 shows one example implementation of the DBMS 104. The in-memory database management system 900 may be coupled to one or more client applications 902A, 902B. Client applications 902A, 902B may be similar to the client applications 122, 124, 126. The client applications 902A, 902B may communicate with the in-memory database management system 900 through a number of different protocols, including Structured Query Language (SQL), Multi-dimensional Expressions (MDX), Hypertext Transfer Protocol (HTTP), Representational State Transfer (REST), Hypertext Markup Language (HTML).

FIG. 9 also shows a studio 904 that may be used to perform modeling by accessing the in-memory database management system 900. In some examples, the studio 904 may allow complex analysis to be performed on data drawn not only from real time event data and windows, but also from stored database information. In some examples, carbon footprint data may be generated by the studio as described herein.

The in-memory database management system 900 may comprise a number of different components, including an index server 906, an XS engine 908, a statistics server 910, a preprocessor server 912, and a name server 914. These components may operate on a single computing device or may be spread among multiple computing devices (e.g., separate servers). The index server 906 contains the actual data and the engines for processing the data. It may also coordinate and uses the other servers.

The XS engine 908 allows clients to connect to the in-memory database management system 900 using web protocols, such as Hypertext Transfer Protocol (HTTP). Although the XS engine 908 is illustrated as a component of the in-memory database management system 900, in some examples, the XS engine may be implemented as one or more Application Program Interfaces (APIs) and/or services positioned between the client applications 902A, 902B and the in-memory database management system 900. In some examples, the XS engine 908 may handle client requests received in languages other than SQL such as, for example, Multidimensional Expressions (MDX), Hypertext Transfer Protocol (HTTP), Representational State Transfer (REST), Hypertext Markup Language (HTML), etc.

The statistics server 910 collects information about status, performance, and resource consumption from all the other server components. The statistics server 910 can be accessed from the studio 904 to obtain the status of various alert monitors.

The preprocessor server 912 is used for analyzing text data and extracting the information on which the text search capabilities are based.

The name server 914 holds information about the database topology. This is used in a distributed system with instances of the database on different hosts. The name server 914 knows where the components are running and which data is located on which server. In an example embodiment, a separate enqueue server may operate in the manner described above with respect to enqueue servers, specifically with regard to creating and managing light-weight enqueue sessions.

Figure 10:
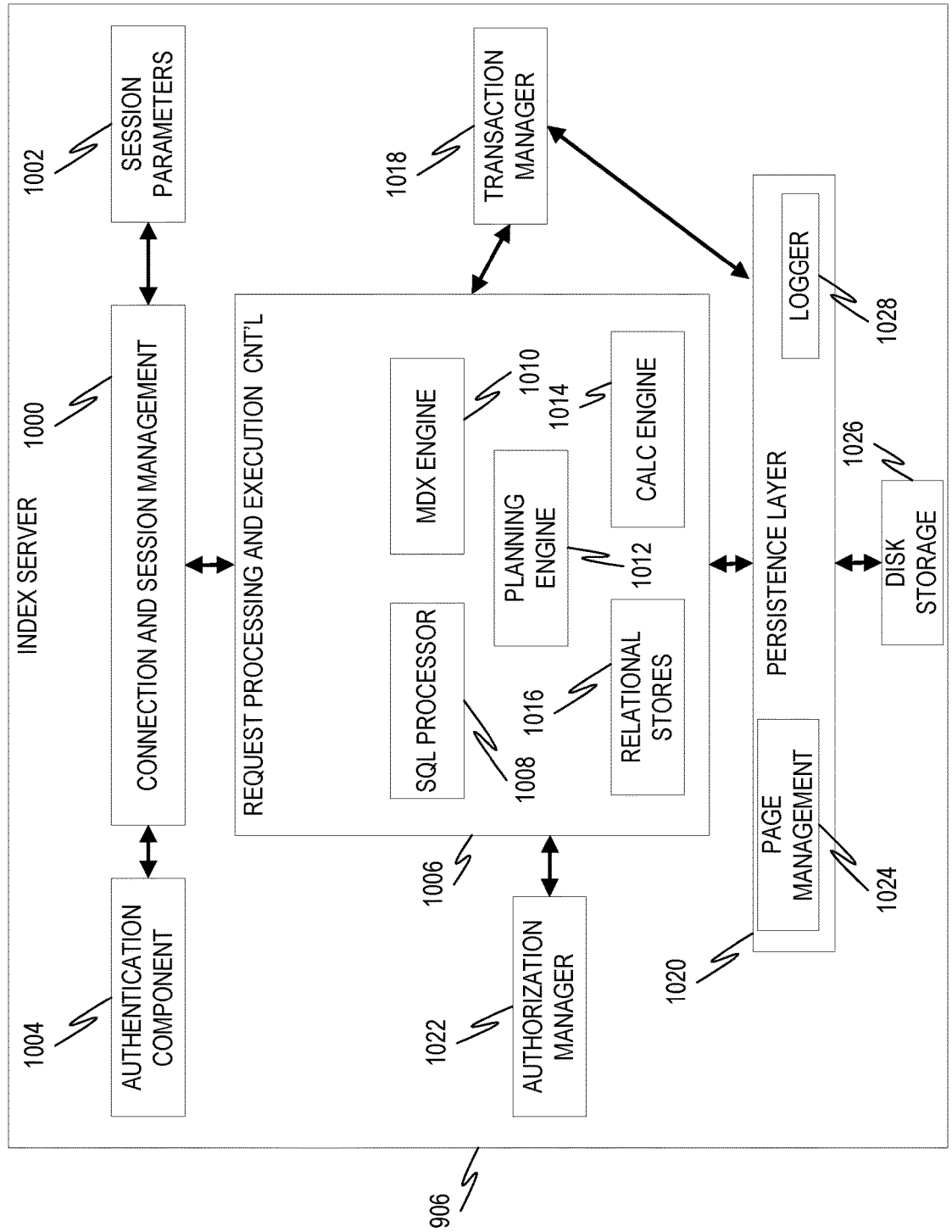
FIG. 10 is a diagram illustrating an example of the index server.

FIG. 10 is a diagram illustrating an example of the index server 906. Specifically, the index server 906 of FIG. 9 is depicted in more detail. The index server 906 includes a connection and session management component 1000, which is responsible for creating and managing sessions and connections for the database clients (e.g. client applications 902A, 902B). Once a session is established, clients can communicate with the database system using SQL statements. For each session, a set of session parameters 1002 may be maintained, such as auto-commit, current transaction isolation level, etc. Users (e.g., system administrators, developers) may be authenticated by the database system itself (e.g., by logging in with log-in information such as a user name and password, using an authentication component 1004) or authentication can be delegated to an external authentication provider such as a Lightweight Directory Access Protocol (LDAP) directory.

Client requests, such as contract form requests, can be analyzed and executed by a set of components summarized as request processing and execution control 1006. An SQL processor 1008 checks the syntax and semantics of the client SQL statements and generates a logical execution plan. Multidimensional expressions (MDX) is a language for querying and manipulating multidimensional data stored in OLAP cubes. As such, an MDX engine 1010 may be provided to allow for the parsing and executing of MDX commands. A planning engine 1012 allows applications to execute basic planning operations in the database layer. One such operation is to create a new version of a dataset as a copy of an existing dataset, while applying filters and transformations.

A calculation engine 1014 implements the various SQL script and planning operations. The calculation engine 1014 creates a logical execution plan for calculation models derived from SQL script, MDX, planning, and domain-specific models. This logical execution plan may include, for example, breaking up a model into operations that can be processed in parallel. The data is stored in relational stores 1016, which implement a relational database in main memory. Each SQL statement may be processed in the context of a transaction. New sessions are implicitly assigned to a new transaction. A transaction manager 1018 coordinates database transactions, controls transactional isolation, and keeps track of running and closed transactions. When a transaction is committed or rolled back, the transaction manager 1018 informs the involved engines about this event so they can execute needed actions. The transaction manager 1018 also cooperates with a persistence layer 1020 to achieve atomic and durable transactions.

An authorization manager 1022 is invoked by other database system components to check whether the user has the specified privileges to execute the requested operations. The database system allows for the granting of privileges to users or roles. A privilege grants the right to perform a specified operation on a specified object.

The persistence layer 1020 ensures that the database is restored to the most recent committed state after a restart and that transactions are either completely executed or completely undone. To achieve this goal in an efficient way, the persistence layer 1020 uses a combination of write-ahead logs, shadow paging, and save points. The persistence layer 1020 also offers a page management interface 1024 for writing and reading data to a separate disk storage 1026, and also contains a logger 1028 that manages the transaction log. Log entries can be written implicitly by the persistence layer 1020 when data is written via the persistence interface or explicitly by using a log interface.

Figure 11:
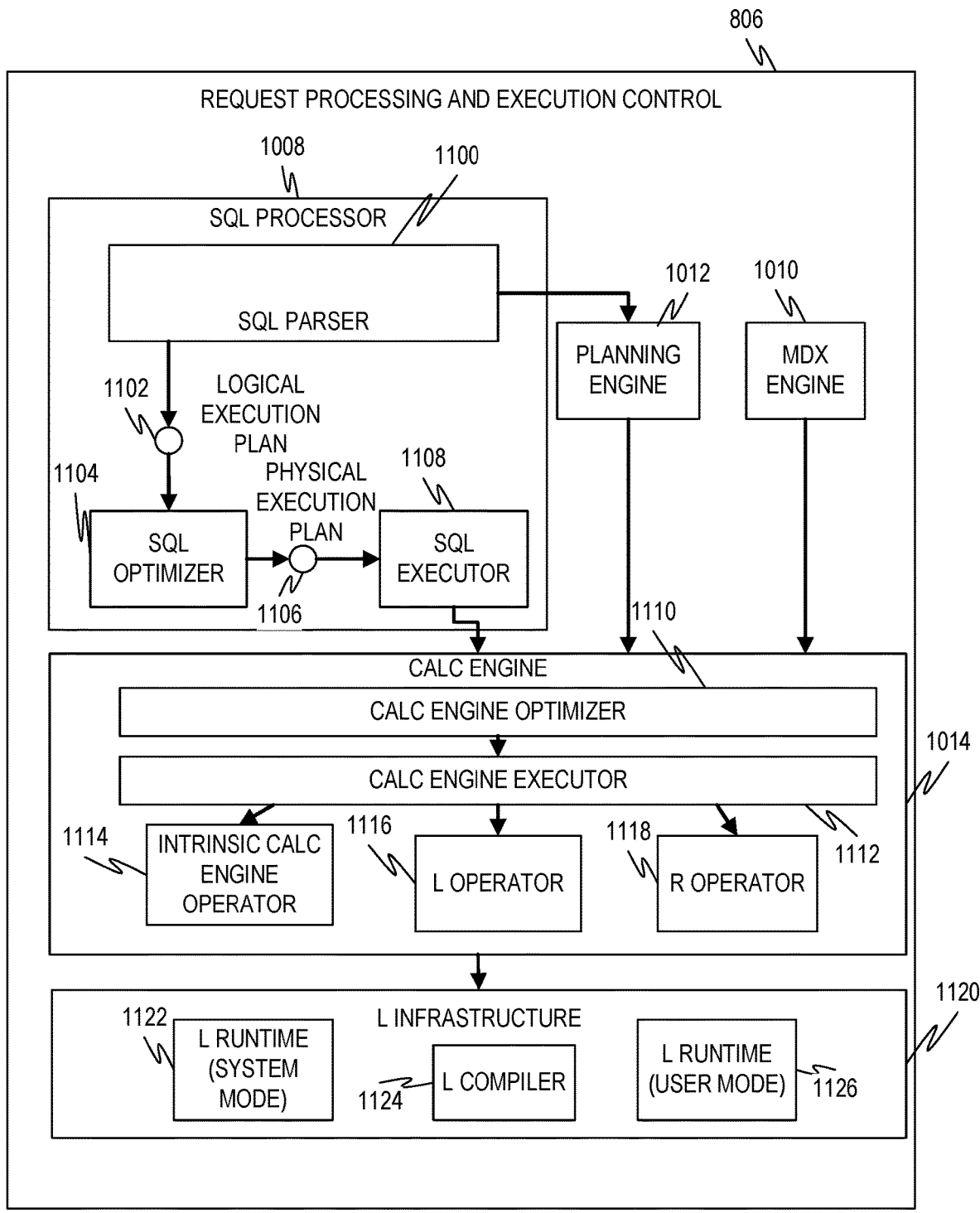
FIG. 11 is a diagram illustrating one example of the request processing and execution control.

FIG. 11 is a diagram illustrating one example of the request processing and execution control 1006. This diagram depicts the request processing and execution control 1006 of FIG. 10 in more detail. The SQL processor 1008 contains an SQL parser 1100, which parses the SQL statement and generates a logical execution plan 1102, which it passes to an SQL optimizer 1104. The SQL optimizer 1104 optimizes the logical execution plan 1102 and converts it to a physical execution plan 1106, which it then passes to a SQL executor 1108. The calculation engine 1014 implements the various SQL script and planning operations, and includes a calc engine optimizer 1110, which optimizes the operations, and a calc engine executor 1112, which executes the operations, as well as an intrinsic calc engine operator 1114, an L operator 1116, and an R operator 1118.

An L infrastructure 1120 includes a number of components to aid in the running of L procedures, including an L-runtime (system mode) 1122, an L compiler 1124, and an L-runtime (User mode) 1126.

EXAMPLES

Example 1 is a system for generating a query of a database, the system comprising: at least one processor programmed to perform operations comprising: accessing from a random access memory (RAM), a knowledge base data structure comprising plurality of nodes and a plurality of edges relating selected nodes of the plurality of nodes, a first edge of the plurality of edges relating at least three of the plurality of nodes; accessing a plurality of training samples, the plurality of training samples comprising a plurality of positive training samples and a plurality of negative training samples, the plurality of positive training samples comprising a first positive training sample describing a relationship between at least two of the plurality of nodes that is to be returned by the query, and the plurality of negative training samples comprising a first negative training sample describing a relationship between at least two of the plurality of nodes that is not to be returned by the query; determining a subgraph, the subgraph comprising a subset of the plurality of nodes and a subset of the plurality of edges, the subset of the plurality of nodes comprising at least two nodes that are also part of the plurality of training samples; executing a subgraph query of the knowledge base data structure, the subgraph query being based at least in part on the subgraph; and returning a query for the database, the query being based at least in part on a result of the subgraph query.

In Example 2, the subject matter of Example 1 optionally includes the determining of the subgraph comprising: generating a plurality of terminal subgraphs based on the plurality of positive training samples, a first terminal subgraph of the plurality of terminal subgraphs comprising the at least two of the plurality of nodes described by the first positive training sample; and identifying, from the plurality of terminal subgraphs, a set of isomorphic terminal subgraphs, the subgraph being based at least in part on the set of isomorphic terminal subgraphs.

In Example 3, the subject matter of any one or more of Examples 1-2 optionally includes determining that a result of the subgraph query does not include any of the plurality of negative training samples, the returning of the query for the database comprising returning the subgraph query.

In Example 4, the subject matter of any one or more of Examples 1-3 optionally includes the result of the subgraph query comprising the first positive training sample and at least one of the plurality of negative training samples.

In Example 5, the subject matter of Example 4 optionally includes determining a constant associated with instances of the plurality of negative training samples from the result of the subgraph query and not associated with instances of the plurality of positive training samples, the returning of the query comprising returning a revised subgraph query based on the subgraph query and the constant.

In Example 6, the subject matter of any one or more of Examples 4-5 optionally includes determining that at least two instances of the plurality of negative training samples from the result of the subgraph query have associated values from the subgraph query that are equal, the returning of the query comprising returning a revised subgraph query comprising a constraint to omit results having the associated values of the plurality of negative training samples from the result of the subgraph query.

In Example 7, the subject matter of any one or more of Examples 1-6 optionally includes adding at least one new edge selected from the plurality of edges of the knowledge base data structure to the subgraph to generate a revised subgraph; and executing a revised subgraph query of the knowledge base data structure, the revised subgraph query being based at least in part on the revised subgraph, and the query for the database being based at least in part on a result of the revised subgraph query.

In Example 8, the subject matter of Example 7 optionally includes the result of the subgraph query comprising a plurality of rows, a first row of the plurality of rows corresponding to the first positive training sample and comprising the at least two of the plurality of nodes of the first positive training sample, and a second row of the plurality of rows corresponding to the first negative training sample and comprising the at least two of the plurality of nodes described by the first negative training sample, the adding of the at least one new edge comprising: determining a possible new edges for each respective row of the plurality of rows; determining a first set of possible new edges that are common among all rows of the result of the subgraph query corresponding to positive training samples; determining a second set of possible new edges that are common among all rows of the result of the subgraph query corresponding to negative training samples; and determining a set of new edges comprising at least one possible new edge from the first set that is not part of the second set, the query for the database also being based at least in part on the set of new edges.

In Example 9, the subject matter of Example 8 optionally includes determining that a result of the revised subgraph query does not discriminate between the plurality of positive training samples and the plurality of negative training samples; adding at least one second new edge selected from the plurality of edges of the knowledge base data structure to the subgraph to generate a second revised subgraph, the at least one new edge being selected at a first depth of the knowledge base data structure, and the at least one second new edge being selected at a second depth of the knowledge base data structure greater than the first depth; and executing a revised subgraph query of the knowledge base data structure, the revised subgraph query being based at least in part on the revised subgraph, and the query for the database being based at least in part on a result of the second revised subgraph query.

Example 10 is a method for generating a query of a database, the method comprising: accessing from a random access memory (RAM), a knowledge base data structure comprising plurality of nodes and a plurality of edges relating selected nodes of the plurality of nodes, a first edge of the plurality of edges relating at least three of the plurality of nodes; accessing a plurality of training samples, the plurality of training samples comprising a plurality of positive training samples and a plurality of negative training samples, the plurality of positive training samples comprising a first positive training sample describing a relationship between at least two of the plurality of nodes that is to be returned by the query, and the plurality of negative training samples comprising a first negative training sample describing a relationship between at least two of the plurality of nodes that is not to be returned by the query; determining a subgraph, the subgraph comprising a subset of the plurality of nodes and a subset of the plurality of edges, the subset of the plurality of nodes comprising at least two nodes that are also part of the plurality of training samples; executing a subgraph query of the knowledge base data structure, the subgraph query being based at least in part on the subgraph; and returning a query for the database, the query being based at least in part on a result of the subgraph query.

In Example 11, the subject matter of Example 10 optionally includes the determining of the subgraph comprising: generating a plurality of terminal subgraphs based on the plurality of positive training samples, a first terminal subgraph of the plurality of terminal subgraphs comprising the at least two of the plurality of nodes described by the first positive training sample; and identifying, from the plurality of terminal subgraphs, a set of isomorphic terminal subgraphs, the subgraph being based at least in part on the set of isomorphic terminal subgraphs.

In Example 12, the subject matter of any one or more of Examples 10-11 optionally includes determining that a result of the subgraph query does not include any of the plurality of negative training samples, the returning of the query for the database comprising returning the subgraph query.

In Example 13, the subject matter of any one or more of Examples 10-12 optionally includes the result of the subgraph query comprising the first positive training sample and at least one of the plurality of negative training samples.

In Example 14, the subject matter of Example 13 optionally includes determining a constant associated with instances of the plurality of negative training samples from the result of the subgraph query and not associated with instances of the plurality of positive training samples, the returning of the query comprising returning a revised subgraph query based on the subgraph query and the constant.

In Example 15, the subject matter of any one or more of Examples 13-14 optionally includes determining that at least two instances of the plurality of negative training samples from the result of the subgraph query have associated values from the subgraph query that are equal, the returning of the query comprising returning a revised subgraph query comprising a constraint to omit results having the associated values of the plurality of negative training samples from the result of the subgraph query.

In Example 16, the subject matter of any one or more of Examples 10-15 optionally includes adding at least one new edge selected from the plurality of edges of the knowledge base data structure to the subgraph to generate a revised subgraph; and executing a revised subgraph query of the knowledge base data structure, the revised subgraph query being based at least in part on the revised subgraph, and the query for the database being based at least in part on a result of the revised subgraph query.

In Example 17, the subject matter of Example 16 optionally includes the result of the subgraph query comprising a plurality of rows, a first row of the plurality of rows corresponding to the first positive training sample and comprising the at least two of the plurality of nodes of the first positive training sample, and a second row of the plurality of rows corresponding to the first negative training sample and comprising the at least two of the plurality of nodes described by the first negative training sample, the adding of the at least one new edge comprising: determining a possible new edges for each respective row of the plurality of rows; determining a first set of possible new edges that are common among all rows of the result of the subgraph query corresponding to positive training samples; determining a second set of possible new edges that are common among all rows of the result of the subgraph query corresponding to negative training samples; and determining a set of new edges comprising at least one possible new edge from the first set that is not part of the second set, the query for the database also being based at least in part on the set of new edges.

In Example 18, the subject matter of Example 17 optionally includes determining that a result of the revised subgraph query does not discriminate between the plurality of positive training samples and the plurality of negative training samples; adding at least one second new edge selected from the plurality of edges of the knowledge base data structure to the subgraph to generate a second revised subgraph, the at least one new edge being selected at a first depth of the knowledge base data structure, and the at least one second new edge being selected at a second depth of the knowledge base data structure greater than the first depth; and executing a revised subgraph query of the knowledge base data structure, the revised subgraph query being based at least in part on the revised subgraph, and the query for the database being based at least in part on a result of the second revised subgraph query.

Example 19 is a non-transitory machine-readable medium comprising instructions thereon that, when executed by at least one processor, because the at least one processor to perform operations comprising: accessing from a random access memory (RAM), a knowledge base data structure comprising plurality of nodes and a plurality of edges relating selected nodes of the plurality of nodes, a first edge of the plurality of edges relating at least three of the plurality of nodes; accessing a plurality of training samples, the plurality of training samples comprising a plurality of positive training samples and a plurality of negative training samples, the plurality of positive training samples comprising a first positive training sample describing a relationship between at least two of the plurality of nodes that is to be returned by a query to a database, and the plurality of negative training samples comprising a first negative training sample describing a relationship between at least two of the plurality of nodes that is not to be returned by the query; determining a subgraph, the subgraph comprising a subset of the plurality of nodes and a subset of the plurality of edges, the subset of the plurality of nodes comprising at least two nodes that are also part of the plurality of training samples; executing a subgraph query of the knowledge base data structure, the subgraph query being based at least in part on the subgraph; and returning a query for the database, the query being based at least in part on a result of the subgraph query.

In Example 20, the subject matter of Example 19 optionally includes the determining of the subgraph comprising: generating a plurality of terminal subgraphs based on the plurality of positive training samples, a first terminal subgraph of the plurality of terminal subgraphs comprising the at least two of the plurality of nodes described by the first positive training sample; and identifying, from the plurality of terminal subgraphs, a set of isomorphic terminal subgraphs, the subgraph being based at least in part on the set of isomorphic terminal subgraphs.

Figure 12:
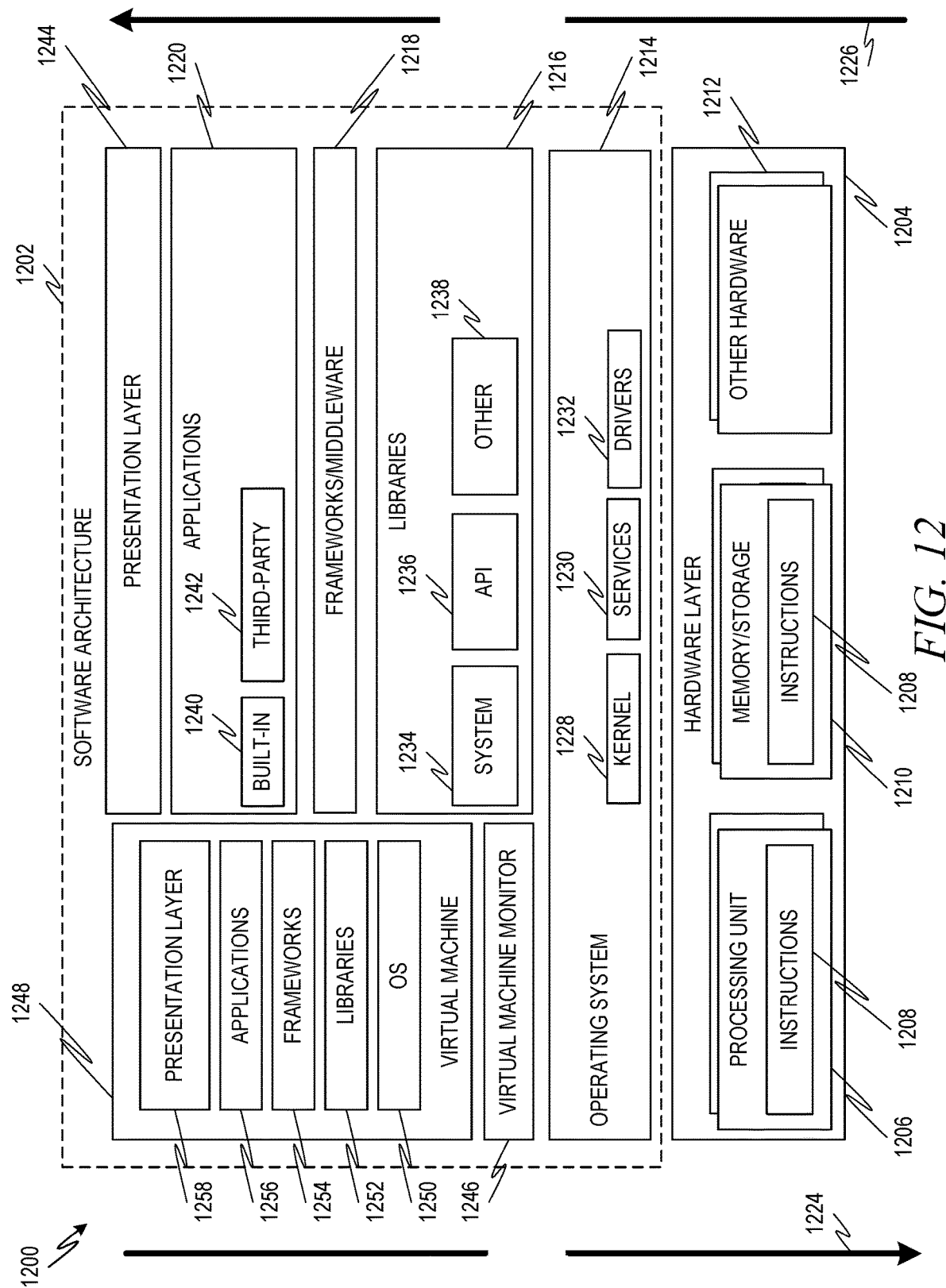
FIG. 12 is a block diagram showing one example of an architecture for a computing device.

FIG. 12 is a block diagram 1200 showing one example of a software architecture 1202 for a computing device. The architecture 1202 may be used in conjunction with various hardware architectures, for example, as described herein. FIG. 12 is merely a non-limiting example of a software architecture and many other architectures may be implemented to facilitate the functionality described herein. A representative hardware layer 1204 is illustrated and can represent, for example, any of the above referenced computing devices. In some examples, the hardware layer 1204 may be implemented according to the architecture of the computer system of FIG. 13.

The representative hardware layer 1204 comprises one or more processing units 1206 having associated executable instructions 1208. Executable instructions 1208 represent the executable instructions of the software architecture 1202, including implementation of the methods, modules, subsystems, and components, and so forth described herein and may also include memory and/or storage modules 1210, which also have executable instructions 1208. Hardware layer 1204 may also comprise other hardware as indicated by other hardware 1212 which represents any other hardware of the hardware layer 1204, such as the other hardware illustrated as part of the architecture 1202.

In the example architecture of FIG. 12, the software architecture 1202 may be conceptualized as a stack of layers where each layer provides particular functionality. For example, the software architecture 1202 may include layers such as an operating system 1214, libraries 1216, middleware layer 1218, applications 1220, and presentation layer 1244. Operationally, the applications 1220 and/or other components within the layers may invoke API calls 1224 through the software stack and access a response, returned values, and so forth illustrated as messages 1226 in response to the API calls 1224. The layers illustrated are representative in nature and not all software architectures have all layers. For example, some mobile or special purpose operating systems may not provide a middleware layer 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of an interrupt and, in response, cause the architecture 1202 to pause its current processing and execute an interrupt service routine (ISR) when an interrupt is accessed.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system 1234 libraries (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The middleware layer 1218 (also sometimes referred to as frameworks) may provide a higher-level common infrastructure that may be utilized by the applications 1220 and/or other software components/modules. For example, the middleware layer 1218 may provide various graphic user interface (GUI) functions, high-level resource management, high-level location services, and so forth. The middleware layer 1218 may provide a broad spectrum of other APIs that may be utilized by the applications 1220 and/or other software components/modules, some of which may be specific to a particular operating system or platform.

The applications 1220 includes built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1242 may invoke the API calls 1224 provided by the mobile operating system such as operating system 1214 to facilitate functionality described herein.

The applications 1220 may utilize built-in operating system functions (e.g., kernel 1228, services 1230 and/or drivers 1232), libraries (e.g., system 1234, API libraries 1236, and other libraries 1238), and middleware layer 1218 to create user interfaces to interact with users of the system. Alternatively, or additionally, in some systems, interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware computing device. A virtual machine is hosted by a host operating system (operating system 1214) and typically, although not always, has a virtual machine monitor 1246, which manages the operation of the virtual machine as well as the interface with the host operating system (i.e., operating system 1214). A software architecture executes within the virtual machine such as an operating system 1250, libraries 1252, frameworks/middleware 1254, applications 1256 and/or presentation layer 1258. These layers of software architecture executing within the virtual machine 1248 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 13:
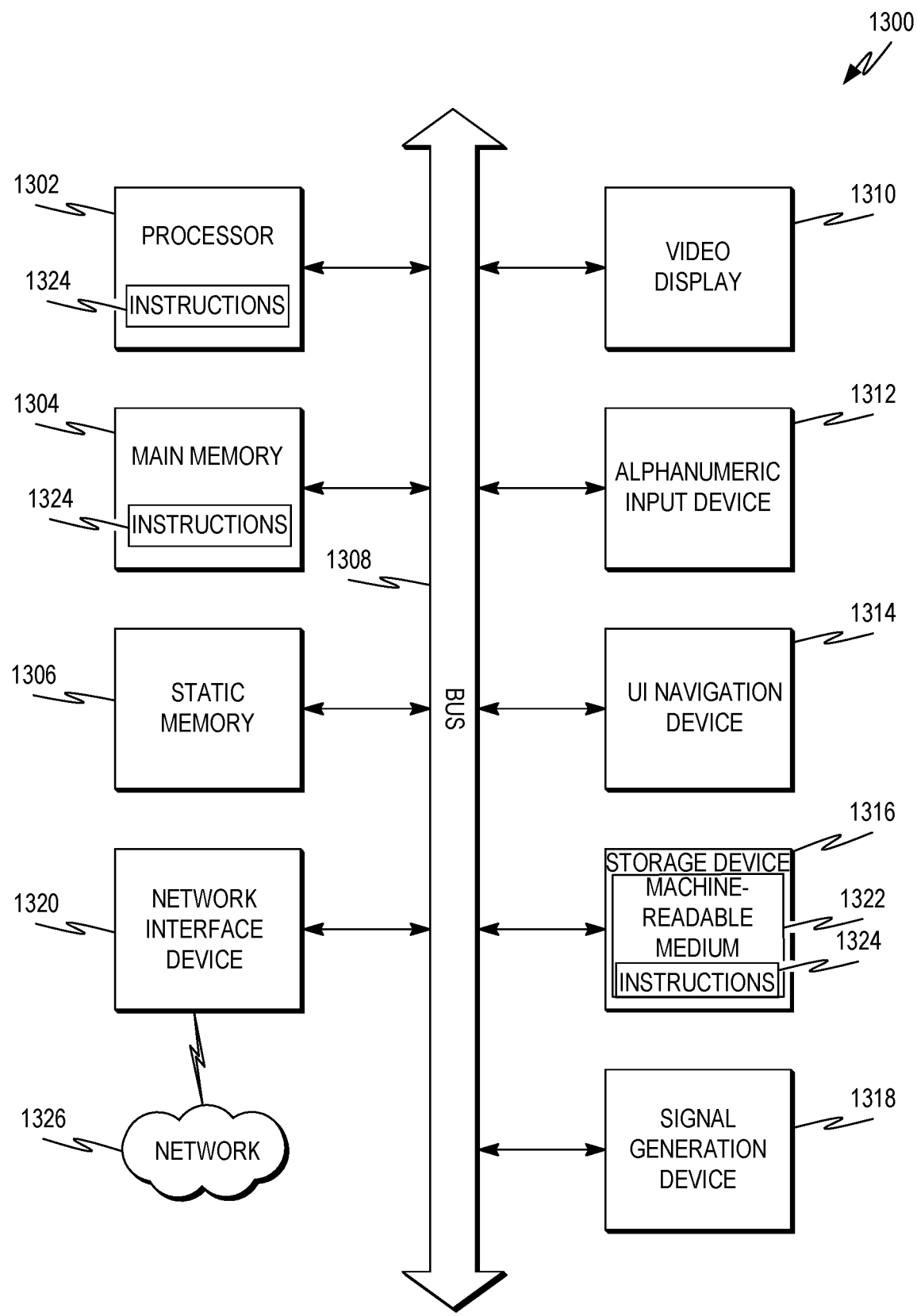
FIG. 13 is a block diagram of a machine in the example form of a computer system within which instructions may be executed for causing the machine to perform any one or more of the methodologies discussed herein.

FIG. 13 is a block diagram of a machine in the example form of a computer system 1300 within which instructions 1324 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation (or cursor control) device 1314 (e.g., a mouse), a disk drive unit 1316, a signal generation device 1318 (e.g., a speaker), and a network interface device 1320.

Machine-Readable Medium

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, with the main memory 1304 and the processor 1302 also constituting machine-readable media 1322.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding, or carrying instructions 1324 for execution by the machine and that cause the machine to perform any one or more of the methodologies of the present disclosure, or that is capable of storing, encoding, or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1324 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for generating a query of a database, the system comprising:
    at least one processor programmed to perform operations comprising:
        accessing from a random access memory (RAM), a knowledge base data structure comprising plurality of nodes and a plurality of edges relating selected nodes of the plurality of nodes, a first edge of the plurality of edges relating at least three of the plurality of nodes;

accessing a plurality of training samples, the plurality of training samples comprising a plurality of positive training samples and a plurality of negative training samples, the plurality of positive training samples comprising a first positive training sample describing a relationship between at least two of the plurality of nodes that is to be returned by the query, and the plurality of negative training samples comprising a first negative training sample describing a relationship between at least two of the plurality of nodes that is not to be returned by the query;

determining a subgraph, the subgraph comprising a subset of the plurality of nodes and a subset of the plurality of edges, the subset of the plurality of nodes comprising at least two nodes that are also part of the plurality of training samples;

executing a subgraph query of the knowledge base data structure, the subgraph query being based at least in part on the subgraph; and returning a query for the database, the query being based at least in part on a result of the subgraph query.

2. The system of claim 1, the determining of the subgraph comprising:

generating a plurality of terminal subgraphs based on the plurality of positive training samples, a first terminal subgraph of the plurality of terminal subgraphs comprising the at least two of the plurality of nodes described by the first positive training sample; and identifying, from the plurality of terminal subgraphs, a set of isomorphic terminal subgraphs, the subgraph being based at least in part on the set of isomorphic terminal subgraphs.

3. The system of claim 1, further comprising determining that a result of the subgraph query does not include any of the plurality of negative training samples, the returning of the query for the database comprising returning the subgraph query.

4. The system of claim 1, the result of the subgraph query comprising the first positive training sample and at least one of the plurality of negative training samples.

5. The system of claim 4, further comprising determining a constant associated with instances of the plurality of negative training samples from the result of the subgraph query and not associated with instances of the plurality of positive training samples, the returning of the query comprising returning a revised subgraph query based on the subgraph query and the constant.

6. The system of claim 4, further comprising determining that at least two instances of the plurality of negative training samples from the result of the subgraph query have associated values from the subgraph query that are equal, the returning of the query comprising returning a revised subgraph query comprising a constraint to omit results having the associated values of the plurality of negative training samples from the result of the subgraph query.

7. The system of claim 1, further comprising:

adding at least one new edge selected from the plurality of edges of the knowledge base data structure to the subgraph to generate a revised subgraph; and executing a revised subgraph query of the knowledge base data structure, the revised subgraph query being based at least in part on the revised subgraph, and the query for the database being based at least in part on a result of the revised subgraph query.

8. The system of claim 7, the result of the subgraph query comprising a plurality of rows, a first row of the plurality of rows corresponding to the first positive training sample and comprising the at least two of the plurality of nodes of the first positive training sample, and a second row of the plurality of rows corresponding to the first negative training sample and comprising the at least two of the plurality of nodes described by the first negative training sample, the adding of the at least one new edge comprising:

determining a possible new edges for each respective row of the plurality of rows;

determining a first set of possible new edges that are common among all rows of the result of the subgraph query corresponding to positive training samples;

determining a second set of possible new edges that are common among all rows of the result of the subgraph query corresponding to negative training samples; and determining a set of new edges comprising at least one possible new edge from the first set that is not part of the second set, the query for the database also being based at least in part on the set of new edges.

9. The system of claim 8, further comprising:

determining that a result of the revised subgraph query does not discriminate between the plurality of positive training samples and the plurality of negative training samples;

adding at least one second new edge selected from the plurality of edges of the knowledge base data structure to the subgraph to generate a second revised subgraph, the at least one new edge being selected at a first depth of the knowledge base data structure, and the at least one second new edge being selected at a second depth of the knowledge base data structure greater than the first depth; and executing a revised subgraph query of the knowledge base data structure, the revised subgraph query being based at least in part on the revised subgraph, and the query for the database being based at least in part on a result of the second revised subgraph query.

10. A method for generating a query of a database, the method comprising:

accessing from a random access memory (RAM), a knowledge base data structure comprising plurality of nodes and a plurality of edges relating selected nodes of the plurality of nodes, a first edge of the plurality of edges relating at least three of the plurality of nodes;

accessing a plurality of training samples, the plurality of training samples comprising a plurality of positive training samples and a plurality of negative training samples, the plurality of positive training samples comprising a first positive training sample describing a relationship between at least two of the plurality of nodes that is to be returned by the query, and the plurality of negative training samples comprising a first negative training sample describing a relationship between at least two of the plurality of nodes that is not to be returned by the query;

determining a subgraph, the subgraph comprising a subset of the plurality of nodes and a subset of the plurality of edges, the subset of the plurality of nodes comprising at least two nodes that are also part of the plurality of training samples;

executing a subgraph query of the knowledge base data structure, the subgraph query being based at least in part on the subgraph; and returning a query for the database, the query being based at least in part on a result of the subgraph query.

11. The method of claim 10, the determining of the subgraph comprising:

generating a plurality of terminal subgraphs based on the plurality of positive training samples, a first terminal subgraph of the plurality of terminal subgraphs comprising the at least two of the plurality of nodes described by the first positive training sample; and identifying, from the plurality of terminal subgraphs, a set of isomorphic terminal subgraphs, the subgraph being based at least in part on the set of isomorphic terminal subgraphs.

12. The method of claim 10, further comprising determining that a result of the subgraph query does not include any of the plurality of negative training samples, the returning of the query for the database comprising returning the subgraph query.

13. The method of claim 10, the result of the subgraph query comprising the first positive training sample and at least one of the plurality of negative training samples.

14. The method of claim 13, further comprising determining a constant associated with instances of the plurality of negative training samples from the result of the subgraph query and not associated with instances of the plurality of positive training samples, the returning of the query comprising returning a revised subgraph query based on the subgraph query and the constant.

15. The method of claim 13, further comprising determining that at least two instances of the plurality of negative training samples from the result of the subgraph query have associated values from the subgraph query that are equal, the returning of the query comprising returning a revised subgraph query comprising a constraint to omit results having the associated values of the plurality of negative training samples from the result of the subgraph query.

16. The method of claim 10, further comprising:
adding at least one new edge selected from the plurality of edges of the knowledge base data structure to the subgraph to generate a revised subgraph; and
executing a revised subgraph query of the knowledge base data structure, the revised subgraph query being based at least in part on the revised subgraph, and the query for the database being based at least in part on a result of the revised subgraph query.

17. The method of claim 16, the result of the subgraph query comprising a plurality of rows, a first row of the plurality of rows corresponding to the first positive training sample and comprising the at least two of the plurality of nodes of the first positive training sample, and a second row of the plurality of rows corresponding to the first negative training sample and comprising the at least two of the plurality of nodes described by the first negative training sample, the adding of the at least one new edge comprising:
determining a possible new edges for each respective row of the plurality of rows;
determining a first set of possible new edges that are common among all rows of the result of the subgraph query corresponding to positive training samples;
determining a second set of possible new edges that are common among all rows of the result of the subgraph query corresponding to negative training samples; and
determining a set of new edges comprising at least one possible new edge from the first set that is not part of the second set, the query for the database also being based at least in part on the set of new edges.

18. The method of claim 17, further comprising:
determining that a result of the revised subgraph query does not discriminate between the plurality of positive training samples and the plurality of negative training samples;
adding at least one second new edge selected from the plurality of edges of the knowledge base data structure to the subgraph to generate a second revised subgraph, the at least one new edge being selected at a first depth of the knowledge base data structure, and the at least one second new edge being selected at a second depth of the knowledge base data structure greater than the first depth; and
executing a revised subgraph query of the knowledge base data structure, the revised subgraph query being based at least in part on the revised subgraph, and the query for the database being based at least in part on a result of the second revised subgraph query.

19. A non-transitory machine-readable medium comprising instructions thereon that, when executed by at least one processor, because the at least one processor to perform operations comprising:
accessing from a random access memory (RAM), a knowledge base data structure comprising plurality of nodes and a plurality of edges relating selected nodes of the plurality of nodes, a first edge of the plurality of edges relating at least three of the plurality of nodes;
accessing a plurality of training samples, the plurality of training samples comprising a plurality of positive training samples and a plurality of negative training samples, the plurality of positive training samples comprising a first positive training sample describing a relationship between at least two of the plurality of nodes that is to be returned by a query to a database, and the plurality of negative training samples comprising a first negative training sample describing a relationship between at least two of the plurality of nodes that is not to be returned by the query;
determining a subgraph, the subgraph comprising a subset of the plurality of nodes and a subset of the plurality of edges, the subset of the plurality of nodes comprising at least two nodes that are also part of the plurality of training samples;
executing a subgraph query of the knowledge base data structure, the subgraph query being based at least in part on the subgraph; and
returning a query for the database, the query being based at least in part on a result of the subgraph query.

20. The non-transitory machine-readable medium of claim 19, the determining of the subgraph comprising:
generating a plurality of terminal subgraphs based on the plurality of positive training samples, a first terminal subgraph of the plurality of terminal subgraphs comprising the at least two of the plurality of nodes described by the first positive training sample; and
identifying, from the plurality of terminal subgraphs, a set of isomorphic terminal subgraphs, the subgraph being based at least in part on the set of isomorphic terminal subgraphs.

* * * * *